US012680382B2

(12) United States Patent
Crum et al.

(10) Patent No.: US 12,680,382 B2
(45) Date of Patent: Jul. 14, 2026

(54) LADDER STIFFENER

(71) Applicant: Leverage Design Holding, LLC, Huntersville, NC (US)

(72) Inventors: Daniel R. Crum, Huntersville, NC (US); Caleb D. Crum, Huntersville, NC (US)

(73) Assignee: Leverage Design Holding, LLC, Huntersville, NC (US)

( * ) Notice: Subject to any disclaimer, the term of this patent is extended or adjusted under 35 U.S.C. 154(b) by 215 days.

(21) Appl. No.: 16/710,546

(22) Filed: Dec. 11, 2019

(65) Prior Publication Data

US 2021/0180403 A1 Jun. 17, 2021

(51) Int. Cl.
*E06C 7/10* (2006.01)
*E06C 1/12* (2006.01)

(52) U.S. Cl.
CPC . *E06C 7/10* (2013.01); *E06C 1/12* (2013.01)

(58) Field of Classification Search
CPC ..... E06C 1/04; E06C 1/06; E06C 1/08; E06C 1/12; E06C 7/10
USPC .......................................................... 182/129
See application file for complete search history.

(56) References Cited

U.S. PATENT DOCUMENTS 175,095 A 3/1876 Hoehn
179,262 A * 6/1876 Buestrin .................. E06C 5/16 182/68.3
189,690 A 4/1877 Boynton
194,588 A 8/1877 Duncan
197,324 A * 11/1877 Boynton .................. E06C 5/04 169/25
204,962 A * 6/1878 Fox ......................... E06C 7/083 182/218
228,647 A 6/1880 King
267,803 A * 11/1882 Name ..................... E06C 7/083 182/218
278,051 A * 5/1883 Seagrave ................ E06C 7/083 182/218
409,722 A 8/1889 Winkless
493,977 A * 3/1893 Childs ....................... E06C 1/32 182/24
508,684 A * 11/1893 Couch ..................... E06C 1/381 182/100
586,341 A 7/1897 Maguire
627,859 A * 6/1899 Locke ....................... E01D 2/04 182/218
662,566 A 11/1900 Jinkins
665,780 A * 1/1901 Hayward ................ E06C 7/083 182/218
735,371 A * 8/1903 Hayward ................ E06C 7/083 182/218
745,343 A * 12/1903 Garrison ................ E06C 7/083 182/216

(Continued)

*Primary Examiner* — Daniel P Cahn
*Assistant Examiner* — Shiref M Mekhaeil
(74) *Attorney, Agent, or Firm* — Laabs Intellectual Property

(57) ABSTRACT

In some embodiments, a stiffener system is arranged for attachment to a ladder. A first stiffener comprises a first arm and a first cable. The first arm is attached to a first rail of a ladder. The first cable is attached to the first rail at a first cable upper attachment location, extends to contact the first arm and extends to attach to the first rail at a first cable lower attachment location. The first arm is oriented at a non-zero angle to an orthogonal axis of the ladder.

20 Claims, 23 Drawing Sheets

(56) References Cited

U.S. PATENT DOCUMENTS 976,074 A * 11/1910 Hartman .................. E06C 1/32 182/24
993,867 A 5/1911 Palmer
1,067,170 A * 7/1913 Hewett .................... E06C 1/20 182/172
1,168,436 A * 1/1916 Stelzer ..................... E04G 1/20 182/144
1,258,048 A * 3/1918 Ryder .................... E06C 1/397 182/64.1
1,776,565 A * 9/1930 Morton .................... E04G 3/28 182/163
1,953,390 A 4/1934 Bosch
2,348,136 A 5/1944 Kidd et al.
2,415,461 A * 2/1947 Causey .................. E04G 1/152 52/691
2,629,532 A * 2/1953 Tupper ................... E06C 7/183 182/163
2,837,260 A 6/1958 Kinnett
3,009,534 A * 11/1961 Folley ...................... E06C 7/10 148/DIG. 148
3,072,881 A * 1/1963 Norris ................... H01R 4/363 403/365
3,179,205 A 4/1965 Rowlette
3,339,174 A * 8/1967 Walter .................. H01R 4/363 403/393
3,698,512 A * 10/1972 Cebular ................... E06C 1/52 182/228.1
3,768,594 A * 10/1973 Kramer .................... E06C 7/06 182/210
3,852,943 A * 12/1974 Healy .................. F16G 11/106 16/257
3,878,917 A * 4/1975 McBride ................ E06C 7/423 182/172
3,954,156 A * 5/1976 Kennedy .................. E06C 7/18 182/107
3,977,139 A * 8/1976 Bryant ................... E04H 12/34 52/697
4,021,875 A * 5/1977 Abell ..................... E01D 15/12 52/640
4,099,693 A 7/1978 Blann
4,186,903 A 2/1980 Fazakerley
4,266,631 A * 5/1981 Larson ..................... E06C 7/06 182/211
4,318,523 A 3/1982 Weatherly
4,331,217 A 5/1982 Stecklow
4,394,887 A 7/1983 Spinks
4,401,187 A 8/1983 VanPatten
4,425,984 A 1/1984 LaChance
4,445,659 A 5/1984 LaChance
4,489,911 A 12/1984 Riley
4,491,196 A 1/1985 Bocker
4,498,263 A * 2/1985 Bocker .................... B66B 9/16 52/121
4,523,733 A 6/1985 Lunden
4,545,460 A 10/1985 Byrd
4,579,198 A 4/1986 Lee
4,586,675 A * 5/1986 Brown .............. B65H 75/4476 242/407
4,605,100 A * 8/1986 Inglese .................... E06C 7/06 182/213
4,632,220 A 12/1986 Murrell
4,656,262 A 4/1987 Osono
4,660,794 A 4/1987 Given
4,699,248 A 10/1987 Roy
4,702,446 A 10/1987 Brown
4,779,298 A * 10/1988 Nichols, Sr. ........... B65G 69/30 193/41
4,792,016 A 12/1988 Ingalsbe et al.
4,899,847 A 2/1990 Lufkin
4,899,849 A 2/1990 Levi
4,913,394 A 4/1990 Schmid
4,924,971 A 5/1990 Rice
4,941,547 A 7/1990 Livick
4,949,809 A 8/1990 Levi
5,000,289 A * 3/1991 Sanchez, III ............. E06C 1/12 182/209
5,020,757 A 6/1991 Sulecki et al.
5,035,299 A * 7/1991 Eisenberg ................ E06C 7/18 182/212
5,067,588 A 11/1991 Bendickson
5,113,973 A 5/1992 Southern
5,121,814 A 6/1992 Southern
5,135,193 A 8/1992 Parris
5,145,226 A 9/1992 LaFontaine
5,181,682 A 1/1993 Indelicato
5,191,954 A 3/1993 Ledford
5,259,525 A 11/1993 Wion
5,293,957 A 3/1994 Lunden
5,316,251 A 5/1994 McGraw
5,348,240 A * 9/1994 Carmo .................. B65H 75/04 242/402
5,429,207 A * 7/1995 Frank ........................ E06C 1/12 182/209
5,529,145 A 6/1996 Allred
5,647,452 A 7/1997 Gauthier
5,649,682 A 7/1997 Martin
5,752,581 A 5/1998 Orchowski
5,868,222 A 2/1999 Charbonneau
5,934,632 A 8/1999 Weaver
5,950,762 A 9/1999 George
5,960,905 A 10/1999 Gardener
5,971,103 A 10/1999 Mulvaney
5,975,242 A * 11/1999 Woller ................. A01M 31/02 182/135
6,029,774 A * 2/2000 Cothern ................. E06C 7/188 182/214
6,045,102 A 4/2000 Terenzoni
6,065,566 A 5/2000 Brown
6,076,636 A 6/2000 Tietge
6,189,654 B1 * 2/2001 Bailey ....................... E06C 1/12 182/211
6,254,045 B1 7/2001 Oatsvall
6,260,663 B1 7/2001 Combs
6,269,907 B1 8/2001 Gillespie
6,328,130 B1 12/2001 Smith
6,352,135 B1 3/2002 Jones
6,398,512 B2 6/2002 Stewart
6,527,084 B2 3/2003 Hrincu
6,533,071 B1 3/2003 Smith
6,672,427 B1 * 1/2004 Sheffield .................. E06C 7/42 182/172
6,691,825 B2 2/2004 Voy
6,698,547 B1 3/2004 Uridel
6,766,990 B1 7/2004 Hileman
6,824,115 B1 11/2004 Batson
7,163,084 B1 * 1/2007 Blehm ................... E06C 7/423 182/172
7,213,717 B2 * 5/2007 Willim ................. B66C 23/826 212/348
7,258,384 B2 * 8/2007 Drabik ................... B60P 1/435 296/61
7,395,985 B2 * 7/2008 Lazarro .................. B63B 21/04 242/405.1
7,607,623 B2 10/2009 Wesolowski
7,624,479 B1 * 12/2009 Lin ........................ F16B 9/058 24/135 N
7,895,693 B2 * 3/2011 Woodmansee, III ..... E06C 1/32 182/115
8,047,330 B1 11/2011 English
8,162,275 B2 4/2012 Reusser
8,230,971 B2 7/2012 Wiseman et al.
8,251,180 B1 8/2012 Paige
8,371,427 B1 * 2/2013 Miklos .................. B65G 69/30 193/35 TE
8,485,316 B2 7/2013 Vestal
8,590,671 B2 11/2013 Potter
8,602,162 B2 12/2013 Dondurur
8,602,163 B2 12/2013 Davis, Jr.
8,607,932 B2 12/2013 Cooper
8,616,335 B1 12/2013 Mosier

(56) References Cited

U.S. PATENT DOCUMENTS 8,695,761 B1 * 4/2014 Berkbuegler ........... E06C 7/188 182/115
8,783,415 B2 7/2014 Bancroft
8,839,907 B2 9/2014 Davis, Jr.
8,839,908 B2 9/2014 Davis, Jr.
8,887,867 B2 11/2014 Blazin et al.
8,973,710 B2 3/2015 Moss et al.
9,010,490 B1 4/2015 Mosier
9,033,104 B1 5/2015 Calloway
9,038,776 B2 5/2015 Green et al.
9,068,395 B1 6/2015 Green
9,085,936 B2 7/2015 Mosier
9,145,733 B2 9/2015 Worthington et al.
9,151,115 B1 10/2015 Forte, Jr.
9,157,276 B2 10/2015 Saucier et al.
9,187,954 B1 11/2015 Parsons
9,249,625 B2 2/2016 Taylor
9,347,264 B2 5/2016 Mosier et al.
9,366,083 B2 6/2016 Graham, Sr.
9,382,759 B2 7/2016 Bolinski et al.
9,404,306 B2 8/2016 Russell et al.
9,482,053 B2 11/2016 Polzen
9,539,948 B1 * 1/2017 Presley ..................... B60R 3/02
9,556,675 B2 1/2017 Reyes
9,644,425 B2 5/2017 Gordon
9,689,205 B2 6/2017 Saucier
9,725,954 B2 8/2017 Graham, Sr.
9,755,354 B1 * 9/2017 Aumiller ................ H01R 13/72
9,771,756 B1 9/2017 Gregoire
9,877,472 B2 * 1/2018 Ketz ......................... E06C 1/39
10,669,777 B2 * 6/2020 Bright ....................... E06C 7/10
10,865,602 B1 * 12/2020 Varshavsky ............... E06C 7/04
11,118,399 B2 * 9/2021 Bright ....................... E06C 1/10
2003/0121723 A1 * 7/2003 Graham, Jr. ........... A63B 27/00 182/136
2003/0201139 A1 10/2003 Voy
2004/0140154 A1 * 7/2004 Thiessen ................... E04G 5/10 182/106
2004/0216955 A1 11/2004 Unger
2005/0023084 A1 2/2005 Lazarus
2005/0224288 A1 * 10/2005 Chesness .............. A01M 31/02 182/115
2007/0039912 A1 * 2/2007 Hinkens ................. B65H 75/06 211/71.01
2007/0187544 A1 * 8/2007 Proebstle ............... B65H 75/06 242/472.5
2009/0007348 A1 * 1/2009 Woodmansee, III ........................ E01D 15/124 182/21
2009/0277772 A1 11/2009 Henderson
2010/0281635 A1 * 11/2010 Hemby ................. E01D 15/133 14/73.1
2010/0326768 A1 * 12/2010 Kerstetter, Jr. ......... E06C 7/186 182/8
2011/0017549 A1 * 1/2011 Lietz ......................... E06C 7/10 182/172
2012/0175188 A1 * 7/2012 Xu ............................ E06C 7/46 182/107
2012/0199417 A1 * 8/2012 Richey .................... E06C 1/383 182/129
2013/0068560 A1 3/2013 Estep
2013/0305627 A1 * 11/2013 Pike .......................... F16B 7/10 52/79.5
2014/0264213 A1 * 9/2014 Nipper .................. A01M 31/02 254/390
2015/0267468 A1 * 9/2015 Moss ........................ E06C 7/48 182/209
2016/0123079 A1 * 5/2016 Ballard ..................... E06C 7/06 182/207
2016/0153234 A1 6/2016 Mazanek
2016/0265278 A1 * 9/2016 Jeffrey ...................... E06C 7/10
2018/0100351 A1 * 4/2018 Bright ....................... E06C 7/12
2019/0309573 A1 * 10/2019 Bright ....................... E06C 1/10
2020/0062167 A1 * 2/2020 Campbell ............. B60P 7/0807
2020/0102789 A1 * 4/2020 Young ....................... E06C 1/12
2021/0372200 A1 * 12/2021 Walsh ...................... A62B 1/06

* cited by examiner

LADDER STIFFENER

BACKGROUND OF THE INVENTION

This invention relates generally to ladders and, in some embodiments, to stiffening systems for ladders. Ladders are known in the art and are often used to reach elevated positions. As ladders increase in length, they tend to become less stable. Ladders can experience deflections, for example due to the weight of a user on the ladder. Ladders can also experience oscillations, for example caused by shifting or oscillating loads such as a user climbing the ladder. Deflections and oscillations are undesirable and can be unnerving for a user.

There remains a need for ladders having novel designs that provide for increased stiffness. There remains a need for devices that can be added to an existing ladder to increase the stiffness of the ladder.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

A brief abstract of the technical disclosure in the specification is provided as well only for the purposes of complying with 37 C.F.R. 1.72. The abstract is not intended to be used for interpreting the scope of the claims.

BRIEF SUMMARY OF THE INVENTION

In some embodiments, a stiffener system is arranged to attach to a ladder and comprises an arm and a cable. The cable comprises a first engagement portion arranged to engage the ladder at a first cable attachment location and a second engagement portion arranged to engage the ladder at a second cable attachment location. The cable comprises an adjustment mechanism arranged to move the second engagement portion along a length of the cable. The cable is arranged to contact the arm. The arm is arranged to engage the ladder at an attachment location between the first cable attachment location and the second cable attachment location. The arm is oriented at a non-zero angle to an orthogonal axis of the ladder.

In some embodiments, the cable comprises an end portion that extends past the second engagement portion, and the end portion comprises a handle.

In some embodiments, the adjustment mechanism comprises a clamp arranged to engage the cable.

In some embodiments, the arm comprises a clamp arranged to fixedly engage the ladder.

In some embodiments, the arm comprises a protrusion arranged to extend into a ladder rung.

In some embodiments, the arm comprises a first leg and a second leg. The first leg comprises a first protrusion arranged to extend into a first ladder rung and the second leg comprises a second protrusion arranged to extend into a second ladder rung.

In some embodiments, the arm comprises an articulating portion arranged for attachment to the ladder. In some embodiments, the articulating portion comprises an articulating bracket. In some embodiments, the articulating portion allows the arm to be moved and reoriented with respect to the ladder.

In some embodiments, the arm comprises a guide member arranged to engage the cable. The guide member comprises a first hook oriented in a first direction and a second hook oriented in a second direction.

In some embodiments, the stiffener system comprises a bracket arranged to attach to the ladder. The cable comprises a connector arranged to engage the bracket. In some embodiments, the bracket comprises a shaped aperture and the connector comprises a protrusion comprising a key. The protrusion is positionable in the shaped aperture. The cable comprises a locked orientation wherein the key cannot exit the shaped aperture and a disengagable orientation wherein the key can pass through the shaped aperture. In some embodiments, the connector comprises an engagement mechanism having a first orientation and a second orientation. In the first orientation, the connector is moveable along a length of the cable and in the second orientation, the connector is fixed along the length of the cable.

In some embodiments, the ladder comprises a first ladder portion arranged to move with respect to a second ladder portion and the stiffener system further comprises a lock mechanism arranged to attach to the second ladder portion. The lock mechanism comprises a lock member arranged to move with respect to the second ladder portion. The lock member comprises a contacting surface arranged to contact the first ladder portion.

In some embodiments, a stiffener system is arranged for attachment to a ladder. In some embodiments, the ladder comprises a first rail, a second rail and a plurality of rungs extending between the first rail and the second rail, and defines a longitudinal axis, a lateral axis and an orthogonal axis. In some embodiments, the stiffener system comprises a first stiffener and a second stiffener. The first stiffener comprises a first arm and a first cable. The first arm is attached to the first rail. The first cable is attached to the first rail at a first cable upper attachment location, extends to contact the first arm and extends to attach to the first rail at a first cable lower attachment location. The second stiffener comprises a second arm and a second cable. The second arm is attached to the second rail. The second cable is attached to the second rail at a second cable upper attachment location, extends to contact the second arm and extends to attach to the second rail at a second cable lower attachment location. The first arm is oriented at a non-zero angle to the orthogonal axis and the second arm is oriented at a non-zero angle to the orthogonal axis.

In some embodiments, the first arm and the second arm are arranged for orientation at equal-but-opposite angles to a portion of the ladder.

In some embodiments, the first cable comprises an end portion extending past the first cable lower attachment location.

In some embodiments, the first cable comprises an adjustment mechanism arranged to adjust a length portion of the first cable located between the first cable upper attachment location and the first cable lower attachment location. In some embodiments, the second cable comprises an adjustment mechanism.

In some embodiments, an adjustment mechanism surrounds the first cable and is moveable along the length of the first cable. In some embodiments, the adjustment mechanism comprises a clamp.

In some embodiments, the first arm comprises a first protrusion arranged for orientation in a first rung. In some embodiments, the first protrusion is arranged to extend through the first rail. In some embodiments, the second arm comprises a second arm protrusion arranged for orientation in the first rung. In some embodiments, the second arm protrusion is arranged to extend through the second rail. In some embodiments, the first arm further comprises a second protrusion arranged for orientation in a second rung.

In some embodiments, the stiffener system comprises a bracket arranged for attachment to the ladder. The bracket comprises a shaped aperture. The first cable comprises a protrusion comprising a key. The protrusion is positionable in the shaped aperture. The first cable has a locked orientation wherein the key cannot exit the shaped aperture and a disengagable orientation wherein the key can pass through the shaped aperture.

In some embodiments, the first arm comprises an articulating bracket arranged for attachment to the ladder. In some embodiments, the articulating bracket allows the first arm to pivot with respect to the ladder about a first axis. In some embodiments, the articulating bracket further allows the first arm to pivot with respect to the ladder about a second axis. In some embodiments, the second axis is orthogonal to the first axis.

In some embodiments, the first arm comprises a clamp arranged to engage the ladder. In some embodiments, the clamp is arranged to fixedly engage the ladder, for example forming a moment transmitting attachment. In some embodiments, the clamp is arranged to fixedly engage a rail of the ladder. In some embodiments, a clamp comprises an open position and a closed position. In the open position, the arm is or can be disengaged from the ladder, and in the closed position, the arm is fixedly engaged with the ladder.

In some embodiments, a stiffener system is arranged for attachment to a ladder. In some embodiments, the ladder comprises a first ladder portion arranged to move with respect to a second ladder portion. In some embodiments, the first ladder portion comprises a rung and the second ladder portion comprises a rail. In some embodiments, stiffener system comprises an arm, a cable and a lock mechanism. The arm is arranged to attach to the ladder at an arm attachment location. The cable is arranged to attach to the ladder at a first location, extend to engage the arm and extend to attach to the ladder at a second location. The lock mechanism is arranged to attach to the second ladder portion. The lock mechanism comprises a lock member arranged to move with respect to the second ladder portion. The lock member comprises a contacting surface arranged to contact the first ladder portion. In some embodiments, the lock mechanism is arranged to attach to the rail and the contacting surface is arranged to contact the rung.

In some embodiments, a ladder comprises a first rail, a second rail and a plurality of rungs extending between the first rail and the second rail. A first stiffener comprises a first arm and a first cable. The first arm is attached to the first rail. The first cable is attached to the first rail at a first cable upper attachment location, extends to contact the first arm and extends to attach to the first rail at a first cable lower attachment location. A second stiffener comprises a second arm and a second cable. The second arm is attached to the second rail. The second cable is attached to the second rail at a second cable upper attachment location, extends to contact the second arm and extends to attach to the second rail at a second cable lower attachment location. The ladder comprises a longitudinal axis, a lateral axis and an orthogonal axis. The first arm is oriented at a non-zero angle to the orthogonal axis and the second arm is oriented at a non-zero angle to the orthogonal axis.

In some embodiments, the first arm and the second arm are oriented at equal-but-opposite angles to the orthogonal axis.

In some embodiments, the first cable comprises an end portion extending past the first cable lower attachment location.

In some embodiments, the first cable comprises an adjustment mechanism arranged to adjust a length portion of the first cable located between the first cable upper attachment location and the first cable lower attachment location. In some embodiments, the second cable comprises an adjustment mechanism.

In some embodiments, an adjustment mechanism surrounds the first cable and is moveable along the length of the first cable. In some embodiments, the adjustment mechanism comprises a clamp.

In some embodiments, the first arm comprises a first protrusion oriented in a first rung. In some embodiments, the first protrusion extends through the first rail. In some embodiments, the second arm comprises a second arm protrusion oriented in the first rung. In some embodiments, the second arm protrusion extends through the second rail. In some embodiments, the first arm further comprises a second protrusion oriented in the second rung.

In some embodiments, the first rail comprises a shaped aperture and the first cable comprises a protrusion comprising a key. The protrusion is positionable in the shaped aperture. The first cable has a locked orientation wherein the key cannot exit the shaped aperture and a disengagable orientation wherein the key can pass through the shaped aperture.

In some embodiments, the first stiffener is disengageble from the first rail.

In some embodiments, the first arm is repositionable with respect to the first rail between a stowed orientation and a deployed orientation.

In some embodiments, the first arm comprises a cable guide comprising a guide passageway, the first cable oriented in the guide passageway. In some embodiments, the first cable comprises a first orientation when under tension, the first cable unable to exit the guide passageway in the first orientation. In some embodiments, the first cable is positionable to a second orientation wherein the first cable can exit the guide passageway.

In some embodiments, the cable guide comprises a first hook and a second hook, the first hook and the second hook facing different directions. In some embodiments, the first hook and the second hook are separated by a gap. In some embodiments, the guide passageway passes through the first hook and the second hook. In some embodiments, an insertion passageway is located between the first hook and the second hook.

In some embodiments, the ladder comprises a first portion and a second portion moveable with respect to the first portion. In some embodiments, the first portion is arranged to slide along an axis with respect to the second portion. In some embodiments, the first portion is arranged to rotate about an axis with respect to the second portion. In some embodiments, the first portion comprises the first cable lower attachment location and the second portion comprises the first cable upper attachment location. In some embodiments, the first arm comprises a first leg and a second leg, the first leg attached to the second portion, the second leg attached to the first portion.

In some embodiments, a ladder comprises a lock mechanism arranged to lock the first portion against moving with respect to the second portion. In some embodiments, the lock mechanism is attached to the second portion and a lock member is moveable with respect to the second portion. In some embodiments, the lock member comprises a contacting surface that contacts the first portion. In some embodiments, the contacting surface comprises a camming surface.

In some embodiments, the first arm is moveable with respect to the first rail between a deployed orientation and a stowed orientation. In some embodiments, the first arm comprises a storage bracket for storing the first cable. In some embodiments, the first rail comprises a clip arranged to engage the first arm and retain the first arm in a stowed orientation.

In some embodiments, a ladder comprises a positioner arranged to position the first arm in the deployed orientation. In some embodiments, a central axis of the first arm is orthogonal to a longitudinal axis of the ladder in the deployed orientation.

In some embodiments, the first arm comprises a clamp arranged to engage the first rail. In some embodiments, the arm is disengageable from the first rail by disengaging the clamp.

In some embodiments, a ladder further comprises a cross-brace extending between the first arm and the second arm.

In some embodiments, a ladder comprises a first rail, a second rail and a plurality of rungs extending between the first rail and the second rail. A first stiffener comprises a first arm and a first cable. The first arm is attached to the first rail. The first cable is attached to the first rail at a first cable upper attachment location. The first cable contacts the first arm at a first contact point. The first cable is also attached to the first rail at a first cable lower attachment location. A second stiffener comprises a second arm and a second cable. The second arm is attached to the second rail. The second cable is attached to the second rail at a second cable upper attachment location. The second cable contacts the second arm at a second contact point. The second cable is also attached to the second rail at a second cable lower attachment location. A distance between the first contact point and the second contact point is greater than a distance between the first rail and the second rail.

In some embodiments, a ladder comprises a first rail, a second rail and a plurality of rungs extending between the first rail and the second rail. A stiffener comprises an arm and a cable. The arm is attached to the first rail and comprises a guide member comprising a first hook and a second hook defining a guide passageway. The cable is attached to the first rail at an upper attachment location. A portion of the cable is oriented in the guide passageway and contacting the guide member. The cable is also attached to the first rail at a lower attachment location.

In some embodiments, the guide member defines an insertion passageway in fluid communication with the guide passageway. In some embodiments, a central axis of the guide passageway is oriented at an angle to a central axis of the insertion passageway. In some embodiments, the insertion passageway is defined between the first hook and the second hook.

In some embodiments, the first hook is oriented in a first direction and the second hook oriented in a second direction different from the first direction. In some embodiments, the first hook and the second hook face opposite directions.

In some embodiments, the guide member comprises a cable seat and the cable seat comprises curvature.

In some embodiments, a ladder stiffener comprises an arm and a cable. The cable comprises a first engagement portion and a second engagement portion. The first engagement portion is arranged to engage the ladder at a first cable attachment location. The second engagement portion is arranged to engage the ladder at a second cable attachment location. The cable comprises an adjustment mechanism arranged to move the second engagement portion along a length of the cable. The cable is arranged to contact the arm. The arm is arranged to engage the ladder at an attachment location between the first cable attachment location and the second cable attachment location.

In some embodiments, the arm comprises a clamp arranged to engage the ladder.

In some embodiments, the arm comprises a protrusion arranged to extend into a ladder rung. In some embodiments, the arm comprises a second protrusion arranged to extend into a second ladder rung.

In some embodiments, the arm comprises a guide member comprising a first hook and a second hook defining a guide passageway.

In some embodiments, the first engagement portion comprises a bracket and a connector. In some embodiments, the bracket is attachable to the ladder, the connector is attached to the cable and the connector is arranged to engage the bracket. In some embodiments, the bracket comprises a shaped aperture and the connector comprises a complimentary shaped key.

In some embodiments, a method comprises providing a stiffener comprising an arm and a cable and attaching a first portion of the cable to a ladder at a first cable attachment location. A second portion of the cable is attached to the ladder at a second cable attachment location. The arm is attached to the ladder at a location between the first cable attachment location and the second cable attachment location. A length of the cable oriented between the first cable attachment location and the second cable attachment location is adjusted.

These and other embodiments which characterize the invention are pointed out with particularity in the claims annexed hereto and forming a part hereof. However, for a better understanding of the invention, its advantages and objectives obtained by its use, reference can be made to the drawings which form a further part hereof and the accompanying descriptive matter, in which there are illustrated and described various embodiments of the invention.

BRIEF DESCRIPTION OF THE DRAWINGS

A detailed description of the invention is hereafter described with specific reference being made to the drawings.

DETAILED DESCRIPTION OF THE INVENTION

Figure 1:
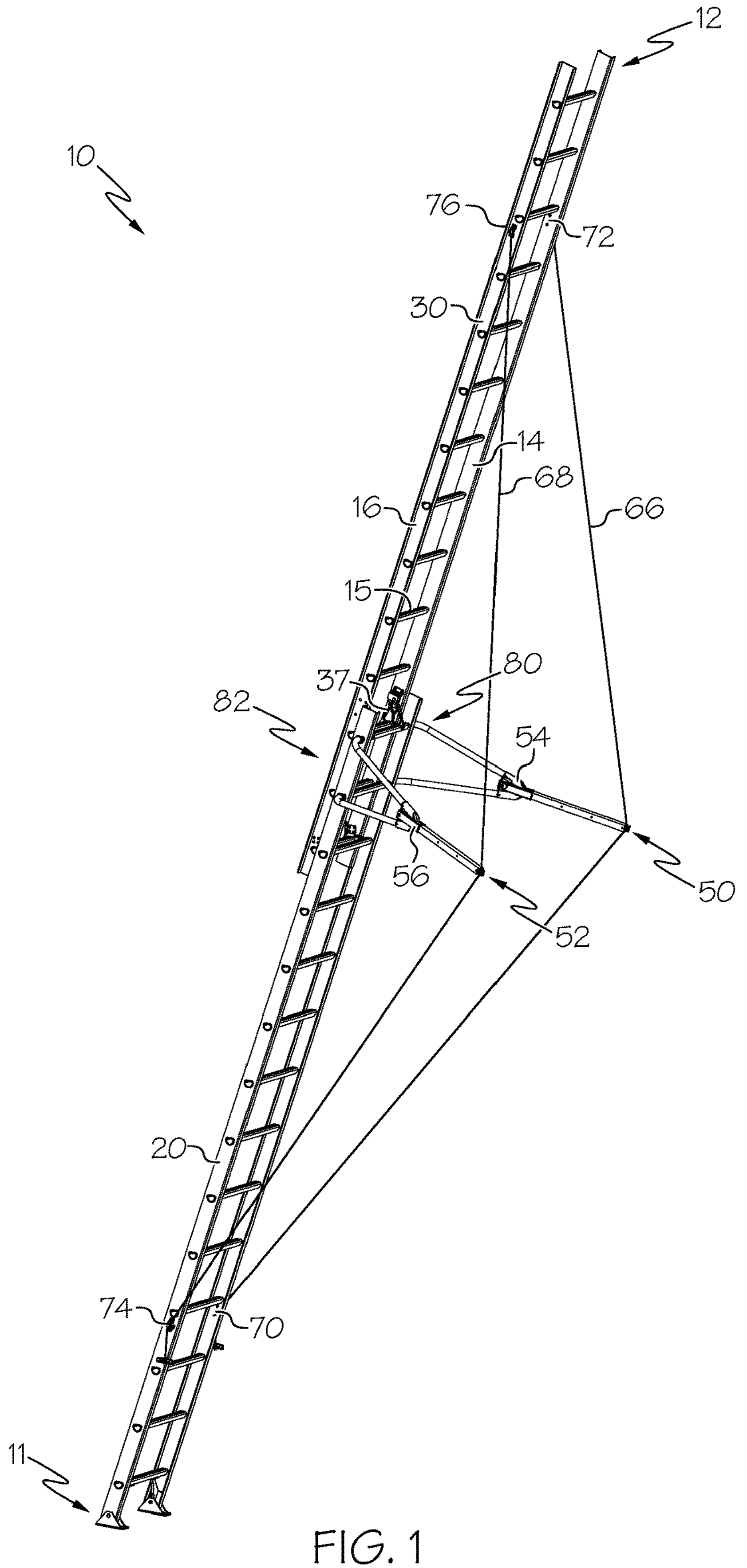
FIG. 1 shows an embodiment of a ladder and an embodiment of a stiffening system.

While this invention may be embodied in many different forms, there are described in detail herein specific embodiments of the invention. This description is an exemplification of the principles of the invention and is not intended to limit the invention to the particular embodiments illustrated.

For the purposes of this disclosure, like reference numerals in the figures shall refer to like features unless otherwise indicated.

FIG. 1 shows an embodiment of a ladder 10 and an embodiment of a stiffener 50 for a ladder 10. Desirably, the stiffener 50 is arranged to structurally reinforce the ladder 10, for example making the ladder 10 stronger and reducing deflections of the ladder 10 under load.

In some embodiments, a ladder 10 comprises a first end 11 and a second end 12. In some embodiments, the first end 11 is constructed and arranged to contact a supporting surface, such as the ground. In some embodiments, the second end 12 is constructed and arranged to extend in an upward direction relative to the first end 11.

In some embodiments, a ladder 10 comprises a first rail 14 and a second rail 16. In some embodiments, each rail 14, 16 extends an entire length of the ladder 10. In some embodiments, a ladder 10 comprises a plurality of rungs 15. In some embodiments, each rung 15 extends between the first rail 14 and the second rail 16.

In some embodiments, a stiffener 50 comprises an arm 54 and a cable 66. Desirably, the arm 54 is supported by the ladder 10. In some embodiments, the arm 54 is attached to the ladder 10 at an arm attachment location 80. The arm 54 can be supported by, or attached to, any suitable location of the ladder 10. In some embodiments, the arm 54 is attached approximately midway between the first end 11 and the second end 12 of the ladder 10, which tends to provide the greatest resistance to deflections of the ladder 10. In some embodiments, the arm 54 is attached to the ladder 10 at a location in the middle third of the length of the ladder 10. In some embodiments, the arm 54 is attached to a rail 14, 16 of the ladder 10. In some embodiments, the arm 54 is attached to the first rail 14.

In some embodiments, the cable 66 is attached to the ladder 10 at a first attachment location 70 and at a second attachment location 72. In some embodiments, the cable 66 is engaged with the arm 54. In some embodiments, the cable 66 contacts the arm 54 at a portion of the cable 66 located between the first attachment location 70 and the second attachment location 72. In some embodiments, the first attachment location 70 and the second attachment location 72 are located on opposite sides of the arm attachment location 80. In some embodiments, the first attachment location 70 is located between the arm attachment location 80 and the first end 11 of the ladder 10. In some embodiments, the second attachment location 72 is located between the arm attachment location 80 and the second end 12 of the ladder 10. In some embodiments, the arm 54 and cable 66 comprise a truss system that structurally reinforces the ladder 10. In some embodiments, the cable 66 comprises a tension member and the arm 54 comprises a compression member.

In some embodiments, the arm 54 comprises a first arm 54 and the cable 66 comprises a first cable 66, and the first arm 54 and first cable 66 comprise a first stiffener 50 engaged with the first rail 14.

In some embodiments, a second stiffener 52 is provided. In some embodiments, the second stiffener 52 comprises a second arm 56 and a second cable 68. Desirably, the second arm 56 is supported by the ladder 10. In some embodiments, the second arm 56 is attached to the ladder 10 at a second arm attachment location 82. In some embodiments, the second arm 56 is attached to the second rail 16. In some embodiments, the second arm 56 is attached approximately midway between the first end 11 and the second end 12 of the ladder 10. In some embodiments, positioning of the second arm attachment location 82 is similar to that of the first arm attachment location 80.

In some embodiments, the second cable 68 is attached to the ladder 10 at a third attachment location 74 and at a fourth attachment location 76. In some embodiments, the third attachment location 74 is aligned with the first attachment location 70. In some embodiments, the fourth attachment location 76 is aligned with the second attachment location 72. In some embodiments, the first arm attachment location 80 is aligned with the second arm attachment location 82. In some embodiments, the first stiffener 50 and the second stiffener 52 are similar in size and shape but have opposite orientations.

In some embodiments, the first attachment location 70 comprises a first cable lower attachment location. In some embodiments, the second attachment location 72 comprises a first cable upper attachment location. In some embodiments, the third attachment location 74 comprises a second cable lower attachment location. In some embodiments, the fourth attachment location 76 comprises a second cable upper attachment location.

In some embodiments, a first stiffener 50 and a second stiffener 52 can be non-symmetrical with one another, for example being shaped differently and/or engaging locations of the ladder 10 that are not aligned with one another.

Figure 2:
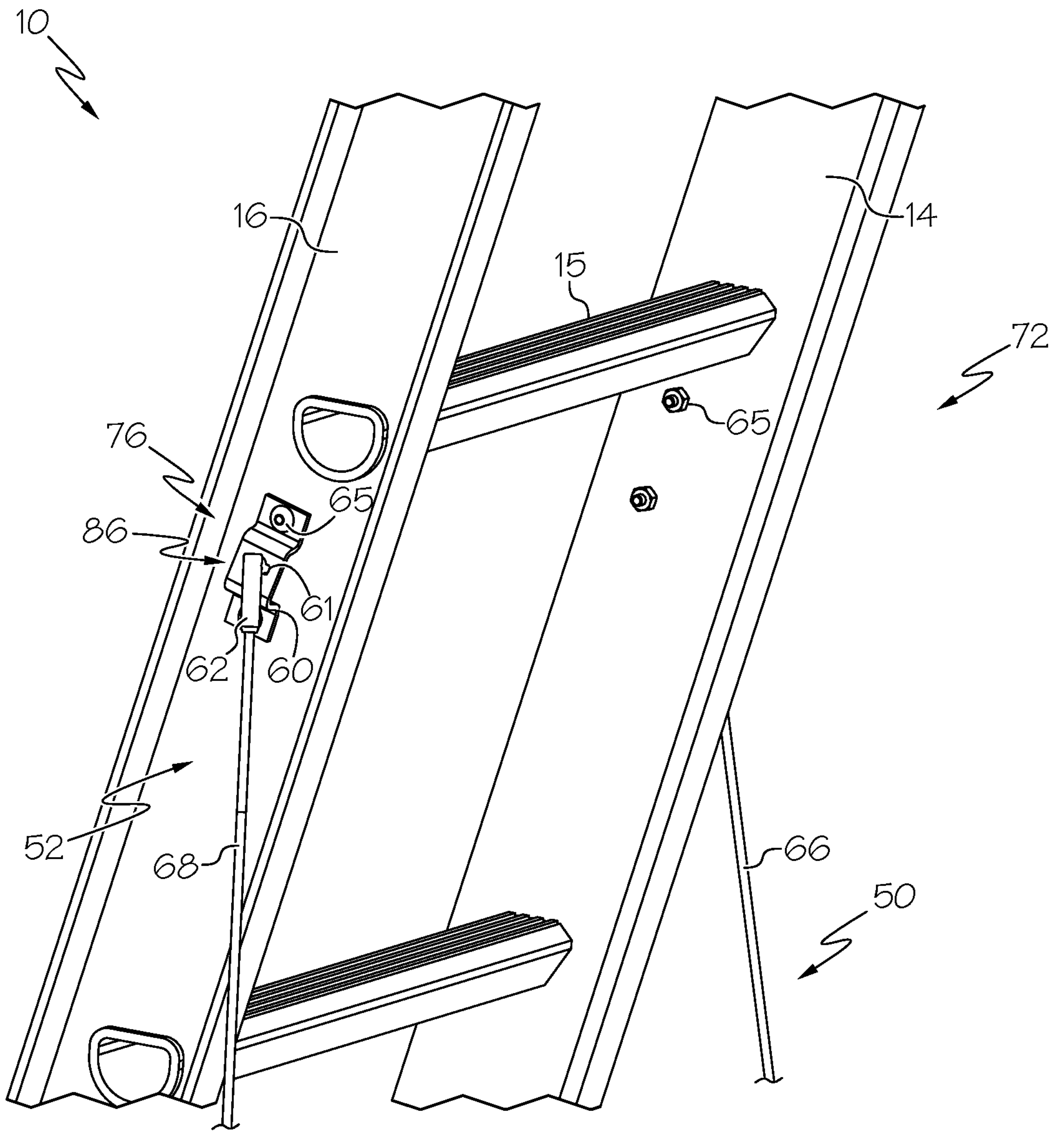
FIG. 2 shows a portion of an embodiment of a ladder.
Figure 3:
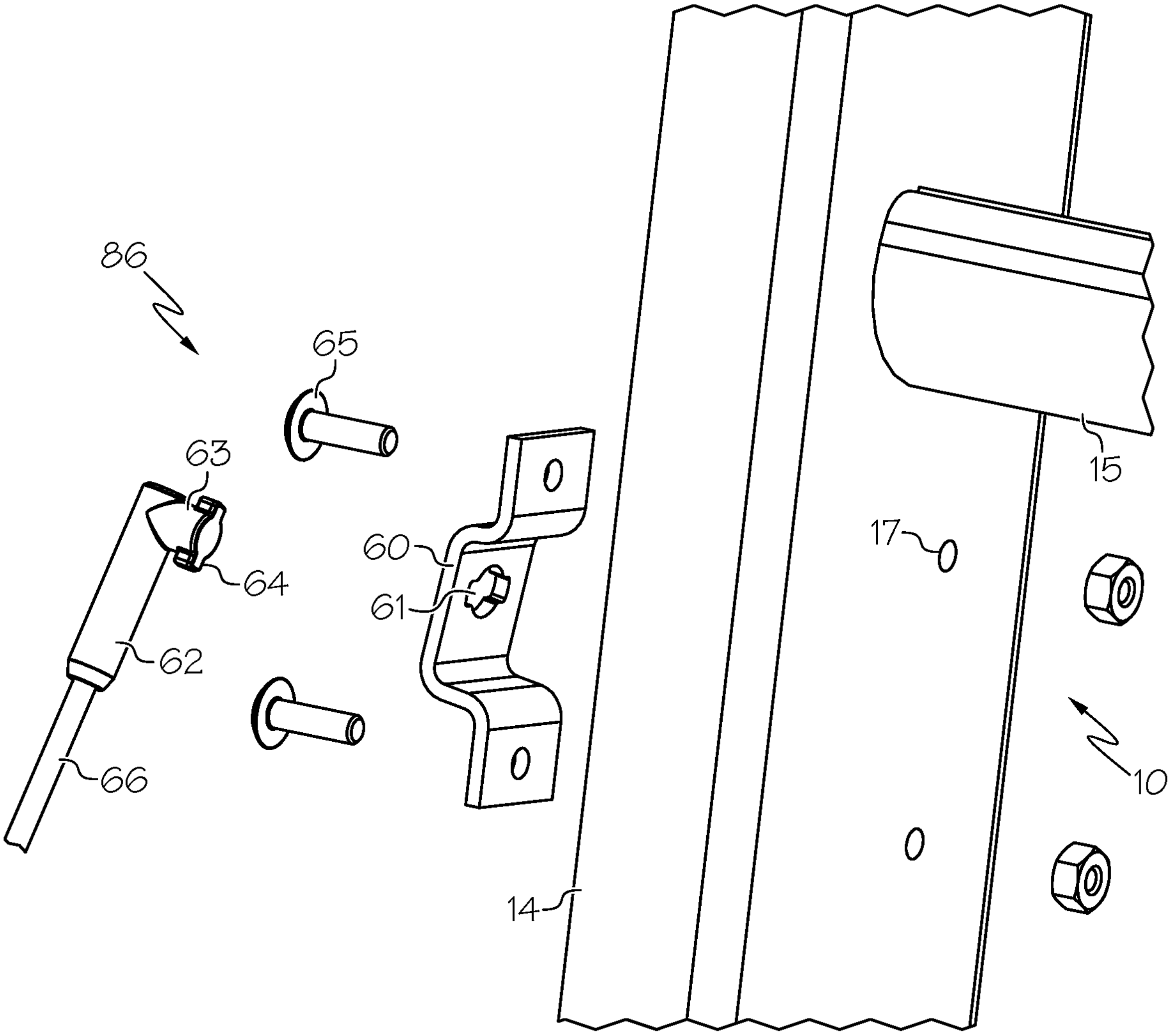
FIG. 3 shows an exploded view of an embodiment of an attachment mechanism between a ladder and a cable.

FIGS. 2 and 3 show an embodiment of an attachment mechanism 86 for attaching a cable 66, 68 to a rail 14, 16. In some embodiments, the attachment mechanism 86 is arranged to provide a secure connection for a cable 66, 68 that will not detach under load. In some embodiments, the attachment mechanism 86 is constructed and arranged to allow the cable 66, 68 to be quickly and easily attached to, or disengaged from, a rail 14, 16 when the cable 66, 68 is not under load.

In some embodiments, an attachment mechanism 86 comprises a bracket 60 and a connector 62 arranged to engage the bracket 60. In some embodiments, the bracket 60 is attachable to the ladder 10. In some embodiments, a bracket 60 is fixedly attached to the ladder 10. In some embodiments, a bracket 60 is fixedly attached to a rail 14, 16. In some embodiments, the connector 62 is fixedly attached to a cable 66, 68. In some embodiments, the bracket 60 comprises an aperture 61 and the connector 62 comprises a protrusion 63 arranged to extend through the aperture 61. In some embodiments, the aperture 61 comprises a non-circular shape and the protrusion 63 comprises a key 64 comprising a complimentary shape. In some embodiments, the key 64 can only pass through the aperture 61 at one or more predetermined aligned orientations of the key 64 with respect to the aperture 61, and the key 64 is unable to pass through the aperture 61 at other non-aligned orientations. Thus, in some embodiments, the cable 66 can be attached to the rail 14 by properly orienting the connector 62 with respect to the bracket 60 and moving the connector 62 such that its key 64 passes through the aperture 61. In some embodiments, the connector 62 can then be rotated with respect to the bracket 60, wherein the key 64 assumes a non-aligned orientation with respect to the aperture 61 and the connector 62 remains engaged with the bracket 60. In some embodiments, the aligned orientation(s) that allow engagement/disengagement comprise positions that the cable 66 and connector 62 will not ordinarily assume when the stiffener 50 is in use. In some embodiments, when the cable 66 is engaged with the ladder 10 and the cable 66 is under tension, the key 64 remains in a non-aligned orientation and the connector 62 cannot detach from the bracket 60.

In some embodiments, an attachment mechanism 86 can be used at any location that a cable 66, 68 engages the ladder 10, such as the attachment locations 70, 72, 74, 76 discussed herein. In some embodiments, an attachment mechanism 86 is used at each location that a cable 66, 68 engages the ladder 10. This allows the cable(s) 66, 68 to be quickly and easily engaged to the ladder 10 or disengaged from the ladder 10.

Figure 4:
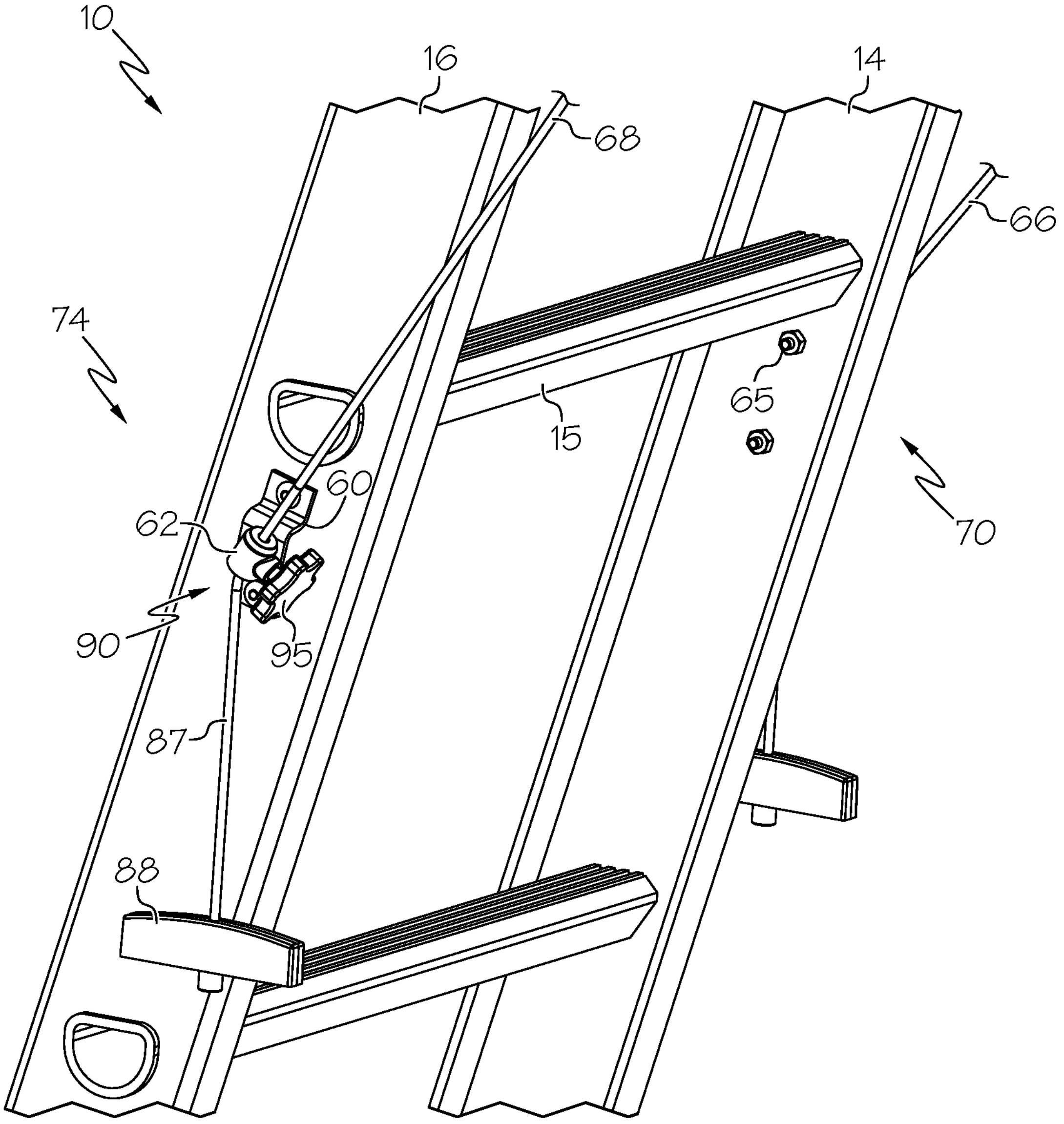
FIG. 4 shows another embodiment of an attachment mechanism and an embodiment of an adjustment mechanism.
Figure 5:
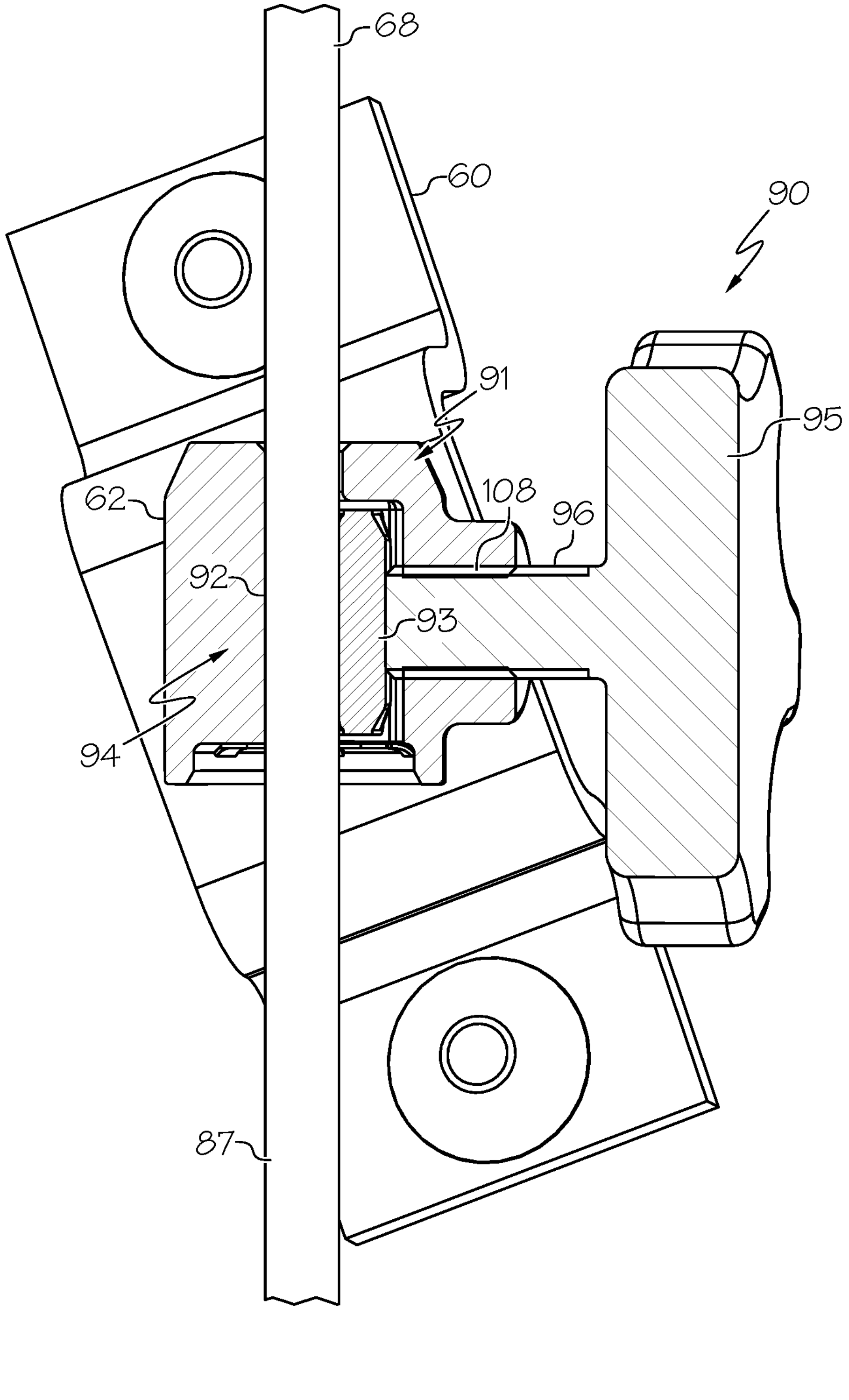
FIG. 5 shows a cross-sectional view of an embodiment of an attachment mechanism and an embodiment of an adjustment mechanism.
Figure 6:
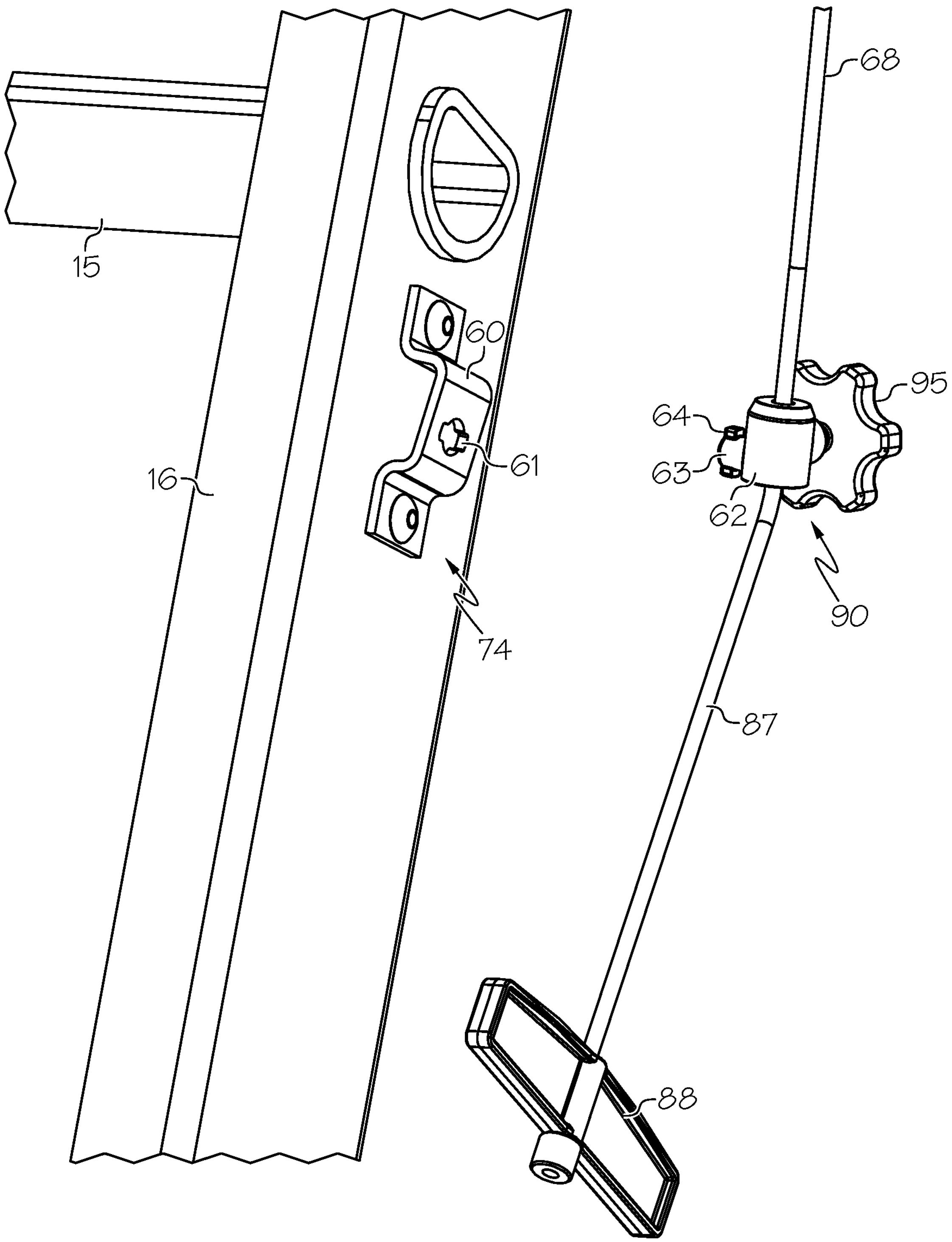
FIG. 6 shows the components shown in FIG. 4 in a disengaged orientation.

FIGS. 4-6 show an embodiment of a cable 66, 68, an embodiment of an adjustment mechanism 90 and another embodiment of an attachment mechanism 86.

In some embodiments, a stiffener 50 comprises an adjustment mechanism 90 arranged to adjust the amount of cable 66 that is subject to tension when the stiffener 50 is installed on a ladder 10. For example, in some embodiments, an adjustment mechanism 90 is arranged to adjust the portion of length of cable 66 that is subject to tension, such as the portion of cable 66 located between attachment mechanisms 86 at the related attachment locations 70, 72. In some embodiments, an adjustment mechanism 90 is engageable to, and disengageable from, the cable 66. In some embodiments, an adjust mechanism 90 comprises a first configuration wherein the position of the adjustment mechanism 90 is fixed along the length of the cable 66 and a second configuration wherein the adjustment mechanism 90 is moveable along the length of the cable 66.

FIG. 5 shows a cross-sectional view of an embodiment of an adjustment mechanism 90. In some embodiments, an adjustment mechanism 90 comprises an engagement mechanism 91 arranged to selectively engage or release the cable 68. In some embodiments, an engagement mechanism 91 comprises a clamp 94. In some embodiments, an engagement mechanism 91 comprises a first portion 92 and a second portion 93 moveable with respect to the first portion 92. In some embodiments, the first portion 92 comprises a fixed portion that comprises a seat for the cable 68. In some embodiments, the second portion 93 comprises a moveable jaw of the clamp 94 that can be tightened against the cable 68. In some embodiments, the second portion 93 comprises a plunger that can be moved closer to, or farther away from, the first portion 92. In some embodiments, a control mechanism is arranged to operate the second portion 93. In some embodiments, a control mechanism comprises a threaded shaft 96 arranged to engage complimentary threads 108 in the adjustment mechanism 90. In some embodiments, a knob 95 is provided to manually rotate the threaded shaft 96, thereby tightening or loosening the engagement between the cable 68 and the engagement mechanism 91. In some embodiments, a control mechanism comprises a quick-release arm that is moveable between a first position wherein the engagement mechanism 91 is fixed along the length of the cable 68 and a second position wherein the engagement mechanism 91 is not fixed along the length of the cable 68.

In some embodiments, a connector 62 comprises a sleeve arranged to surround a cable 68. In some embodiments, a connector 62 comprises an adjustment mechanism 90. In some embodiments, a connector 62 comprises an engagement mechanism 91.

FIG. 6 shows an embodiment of a connector 62 comprising an adjustment mechanism 90 and a protrusion 63 arranged to engage a bracket 60. In some embodiments, a cable 68 comprises a handle 88. In some embodiments, the handle 88 is attached to a portion 87 of the cable 68 that is located distal to the connector 62 along the length of the cable 68. Thus, in some embodiments, the handle 88 is attached to a portion 87 of the cable 68 that is not under tension in the stiffener 50.

In some embodiments, a first connector 62 of a cable 66 can be engaged with a rail 14 at a first attachment location 70 and a second connector 62 of the cable 66 can be engaged with the rail 14 at a second attachment location 72. The handle 88 of the cable 66 can be used to manually apply a tensile load to the cable 66 and an engagement mechanism 91 can be arranged to engage the cable 66, thereby retaining the cable 66 under the tensile load and stiffening a ladder against deflections.

Figure 7:
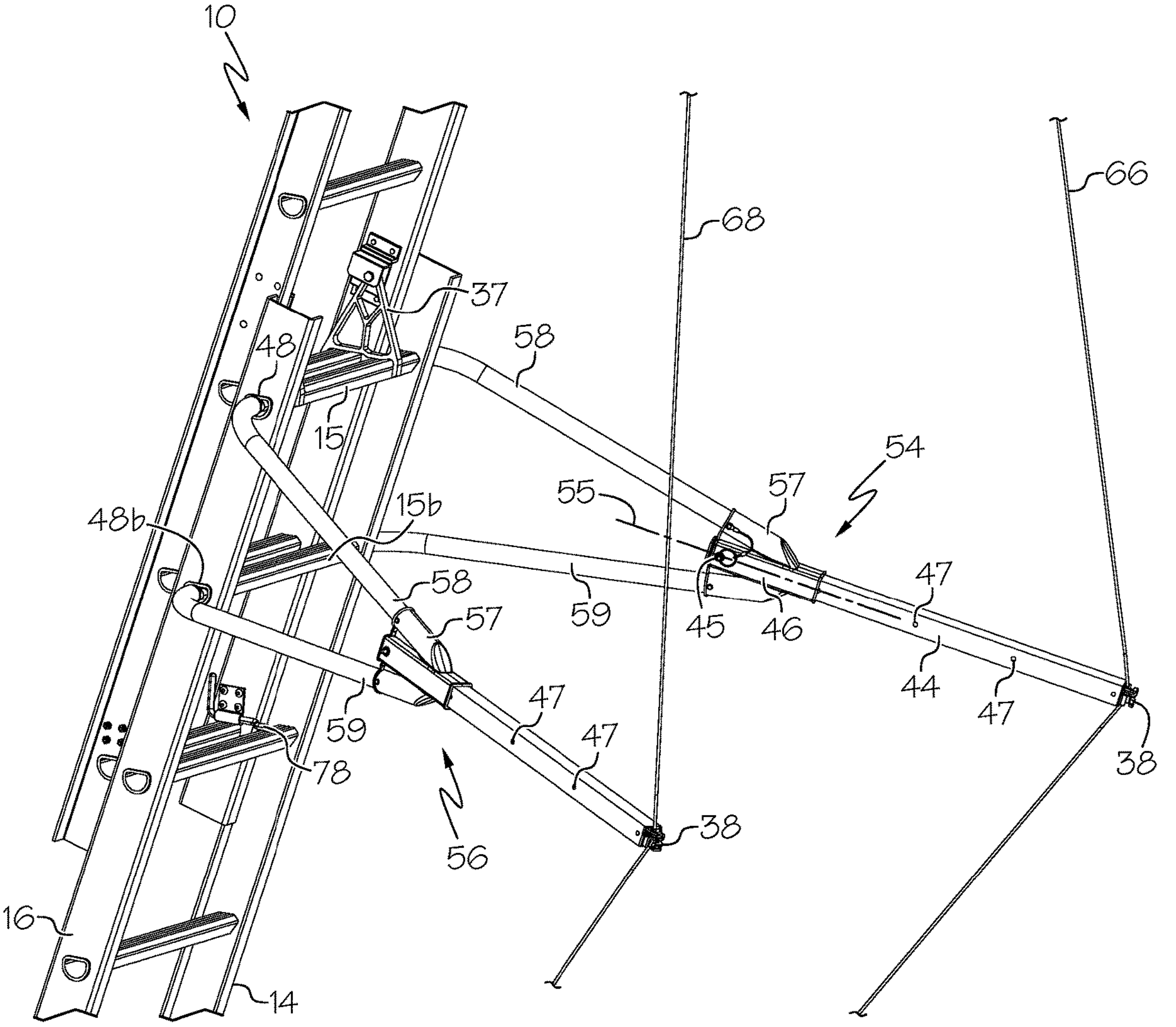
FIG. 7 shows an embodiment of a stiffening system.
Figure 8:
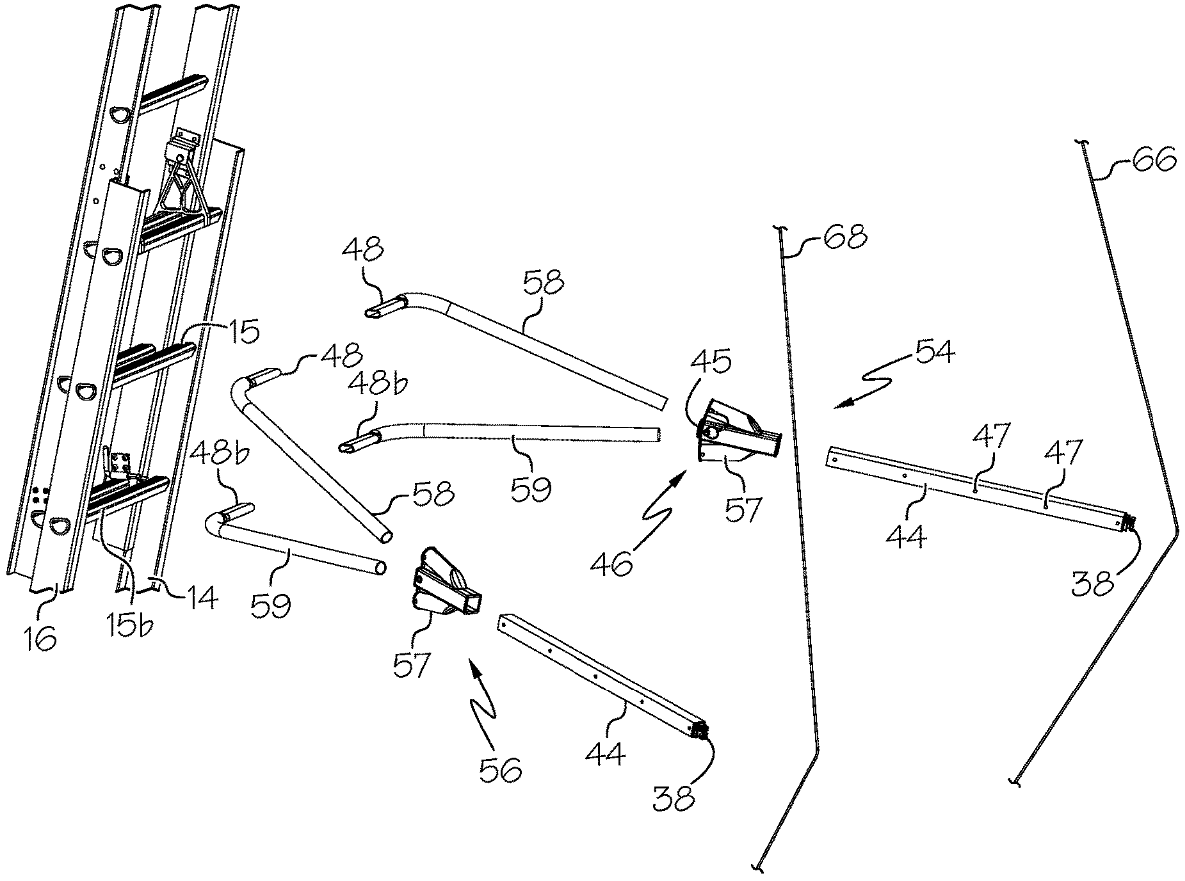
FIG. 8 shows an exploded view of the components shown in FIG. 7.

FIG. 7 shows an embodiment of a first arm 54 and a second arm 56 attached to a ladder 10. FIG. 8 shows an exploded view of the components shown in FIG. 7. In some embodiments, the first arm 54 is attached to a first rail 14 and the second arm 56 is attached to the second rail 16. In some embodiments, each arm 54, 56 comprises a compression member arranged to transmit compressive forces between the ladder 10 and an associated cable 66, 68.

An arm 54, 56 can engage the ladder 10 using any suitable method. In some embodiments, an arm 54, 56 comprises a protrusion 48 arranged to be received by a portion of the ladder 10. In some embodiments, a protrusion 48 is configured to be received by an interior portion of a rung 15 of the ladder 10. In some embodiments, a ladder 10 comprises rungs 15 having a D-shaped cross-sectional shape or otherwise comprising a flattened top, and the protrusion 48 comprises a complimentary shape arranged to engage the rung 15. In some embodiments, a protrusion 48 comprises a flat surface. In some embodiments, a protrusion 48 extends through a rail 14, 16 when positioned in a rung 15.

In some embodiments, an arm 54, 56 comprises a first protrusion 48 and a second protrusion **48*b*. In some embodiments, the first protrusion 48 is oriented in a first rung 15 and the second protrusion 48*b* is oriented in a second rung 15*b*. In some embodiments, the first rung 15 is adjacent to the second rung 15*b* along the length of the ladder 10**.

In some embodiments, an arm 54, 56 comprises a first leg 58 and a second leg 59. In some embodiments, the first leg 58 comprises a first protrusion 48 and the second leg 59 comprises a second protrusion **48*b*. In some embodiments, an arm 54, 56 comprises a central axis 55, and the first leg 58 is oriented at an angle to the central axis 55. In some embodiments, the second leg is oriented at an angle to the central axis 55. In some embodiments, the first leg 58 and the second leg 59 are oriented at equal but opposite angles to the central axis 55. In some embodiments, the first leg 58 and the second leg 59** form an A-frame.

In some embodiments, a length of an arm 54, 56 can be adjusted. In some embodiments, an arm 54, 56 comprises a first portion 44 that is moveable with respect to a second portion 46. In some embodiments, the first portion 44 is moveable along the central axis 55. In some embodiments, an arm 54, 56 can be arranged to have a length selected from a plurality of predetermined length configurations. In some embodiments, an arm 54, 56 comprises a detent system comprising a plurality of detents 47 and an engagement mechanism 45 arranged to engage a detent 47. In some embodiments, the detents 47 comprise apertures and the engagement mechanism 45 comprises a pin 45 arranged to be oriented in an aperture. In some embodiments, the engagement mechanism 45 fastens the first portion 44 to the second portion 46 and fixes a length of the arm 54, 56. In some embodiments, a pin 45 extends through an aperture of the second portion 46 and through an aperture of the first portion 44. In some embodiments, multiple detents 47 are spaced at regular intervals.

In some embodiments, an arm 54, 56 comprises a housing 57 arranged to attach multiple components of the arm 54, 56. In some embodiments, a housing 57 comprises a first cavity arranged to receive a first portion 44 of the arm 54, 56. In some embodiments, a second portion 46 of the arm 54, 56 comprises the housing 57 and the first portion 44 is moveable with respect to the housing 57. In some embodiments, the first cavity comprises a non-circular cross-sectional shape, and the first portion 44 comprises a complimentary shape arranged to be received by the first cavity. In some embodiments, a central axis of the first cavity is parallel to a central axis 55 of the arm 54, 56. In some embodiments, a central axis of the first cavity is collinear with the central axis 55 of the arm 54, 56. In some embodiments, the housing 57 comprises a second cavity arranged to receive a first leg 58. In some embodiments, the housing 57 comprises a third cavity arranged to receive a second leg 59. In some embodiments, a central axis of each of the second cavity and the third cavity are oriented at equal but opposite angles with respect to the central axis of the first cavity.

In some embodiments, an arm 54, 56 comprises a guide member 38 arranged to engage a cable 66, 68.

Figure 9:
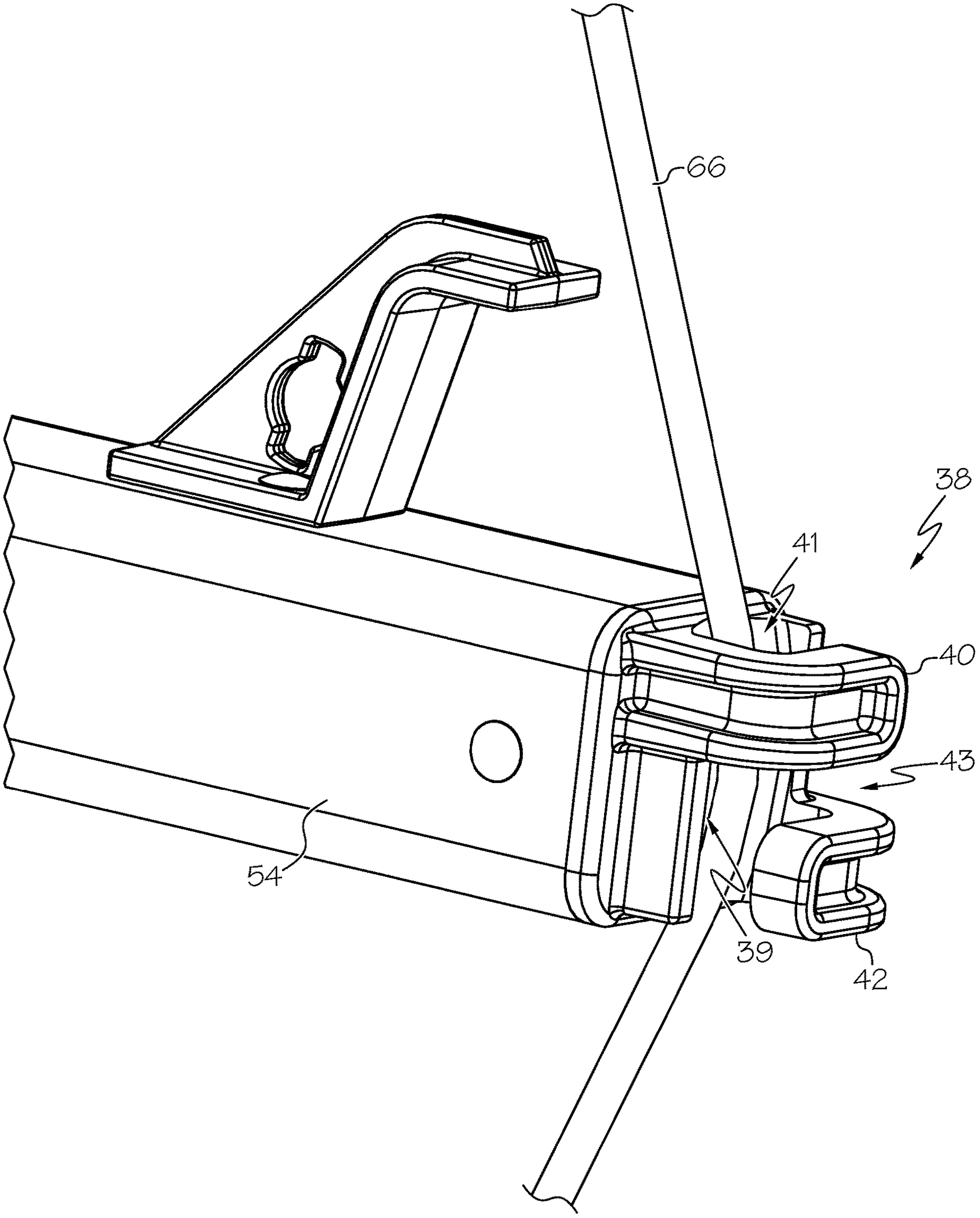
FIG. 9 shows an embodiment of a cable guide member.

FIG. 9 shows an embodiment of a guide member 38 in greater detail. In some embodiments, a guide member 38 is located at an end of an arm 54, 56. In some embodiments, a first end of an arm 54, 56 is attached to a ladder 10 and a second end of the arm 54, 56 comprises a guide member 38.

In some embodiments, a guide member 38 comprises a guide passageway 41 that is arranged to contain a cable 66, 68. In some embodiments, a guide passageway 41 extends substantially parallel to a length portion of the cable 66, 68 when the cable is arranged in an installed orientation. Desirably, the cable 66 is oriented in the guide passageway 41 in an installed orientation. In some embodiments, the guide member 38 is configured such that the cable 66 cannot exit the guide passageway 41 when the cable 66 is under tension in the installed orientation.

In some embodiments, a guide member 38 comprises a first hook 40 and a second hook 42. In some embodiments, the first hook 40 is arranged to face a first direction and the second hook 42 is arranged to face a second direction that is different from the first direction. In some embodiments, the first hook 40 and the second hook 42 face opposite directions. In some embodiments, the first hook 40 comprises a base portion positioned to a first side of the guide passageway 41 and a bend that extends over the guide passageway 41. In some embodiments, the bend extends to a second side of the guide passageway 41. In some embodiments, the second hook 42 comprises a base portion positioned to a second side of the guide passageway 41 and a bend that extends over the guide passageway 41. In some embodiments, the bend extends to the first side of the guide passageway 41. In some embodiments, the first hook 40 and the second hook 42 each comprise a throat portion that defines the guide passageway 41. In some embodiments, the first hook 40 prevents the cable 66 from exiting the guide passageway 41 on the first side and the second hook 42 prevents the cable 66 from exiting the guide passageway 41 on the second side when the cable 66 is under tension in the installed orientation.

In some embodiments, the guide member 38 comprises an insertion passageway 43 that allows the cable 66 to enter and exit the guide passageway 41. In some embodiments, when the cable 66 is in a first orientation, it is unable to exit the guide passageway 41 or enter the insertion passageway 43. In some embodiments, when the cable 66 is moved to a second orientation, the cable 66 is able to exit the guide passageway 41 and move through the insertion passageway 43. In some embodiments, the cable 66 comprises the first orientation when the cable 66 is oriented in the guide passageway 41 under tension in the installed orientation. In some embodiments, when the cable 66 is not under load, a portion of the cable 66 can be arranged to the second orientation, wherein the cable can move though the insertion passageway 43 and disengage the guide member 38. In some embodiments, the longitudinal axis of a segment of cable 66 in the first orientation is nonparallel to the longitudinal axis of the segment in the second orientation.

In some embodiments, the first hook 40 and the second hook 42 are spaced apart and separated by a gap. In some embodiments, the gap comprises the insertion passageway 43. In some embodiments, a longitudinal axis of the guide passageway 41 is nonparallel to a longitudinal axis of the insertion passageway 43. In some embodiments, a longitudinal axis of the guide passageway 41 is generally orthogonal to a longitudinal axis of the insertion passageway 43. In some embodiments, portions of the cable 66 move through the gaps defined by the first hook 40 and second hook 42 as the cable 66 is repositioned from the first orientation to the second orientation.

In some embodiments, a guide member 38 comprises a seat 39 arranged to contact a cable 66. In some embodiments, the seat 39 comprises a curved surface arranged to support the cable 66. In some embodiments, the seat 39 comprises a first curvature arranged to provide contact along a lengthwise surface of the cable 66. In some embodiments, the first curvature comprises a convex shape arranged to compliment a bend in the cable 66 when the cable 66 is installed on a ladder 10. In some embodiments, the seat 39 comprises a second curvature arranged to provide contact along a circumferential outer surface of the cable 66. In some embodiments, the second curvature comprises a concave shape that forms a valley that helps to position the cable 66. In some embodiments, the first curvature is oriented about a first axis and the second curvature is oriented about a second axis that is non-parallel to the first axis. In some embodiments, the first curvature comprises a convex surface contoured around a first axis and the second curvature comprises a concave shape contoured around a second axis.

In some embodiments, at least a portion of the first axis is oriented orthogonal to the second axis.

Figure 10:
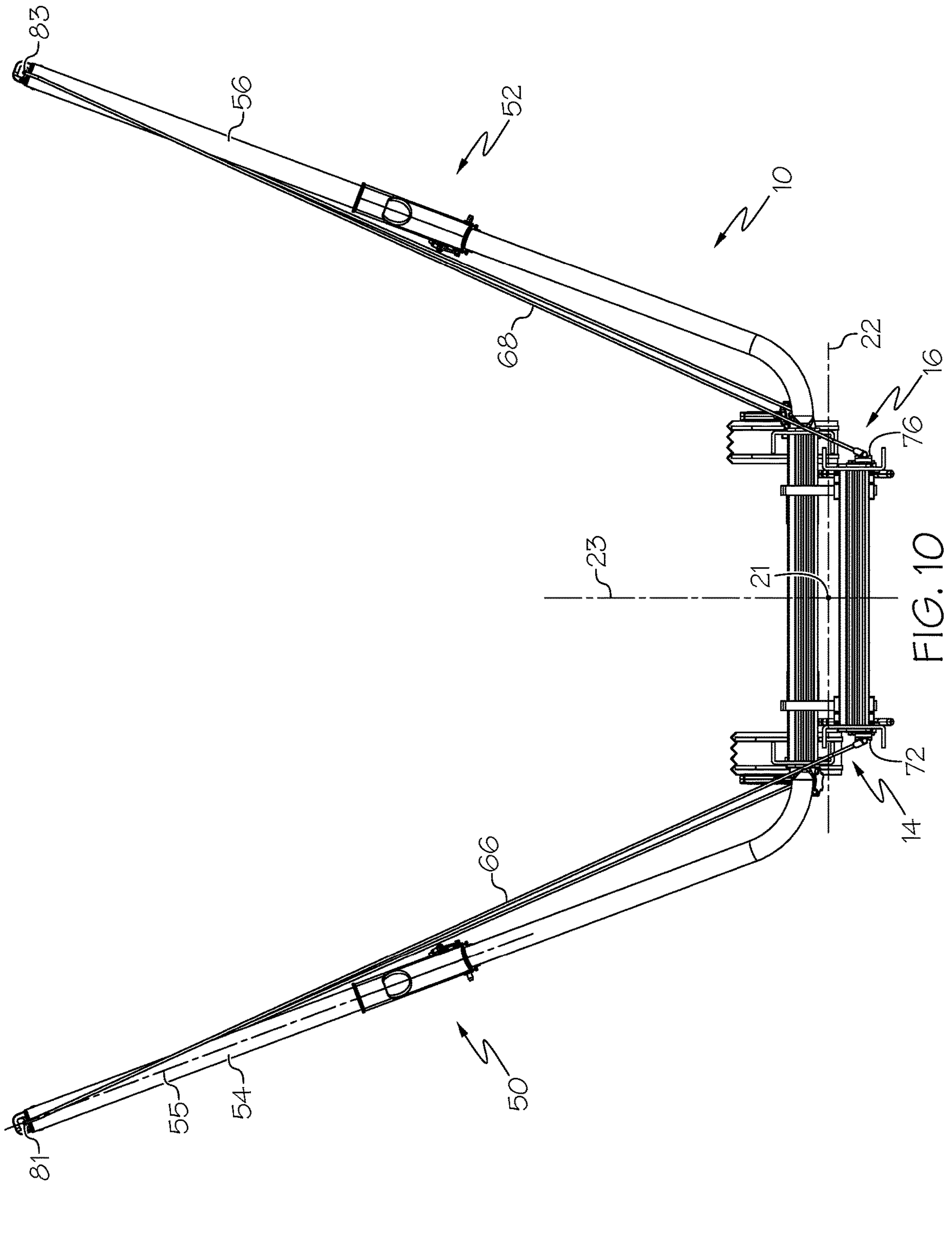
FIG. 10 shows a top view of an embodiment of a ladder and stiffening system.

FIG. 10 shows a top view of an embodiment of a ladder 10 comprising a first stiffener 50 and a second stiffener 52. In some embodiments, the stiffeners 50, 52 are arranged to splay outwardly away from one another, which can provide a greater stiffening effect for the ladder 10.

The ladder 10 defines an axis in each of the three orthogonal dimensions including a longitudinal axis 21, a lateral axis 22 and an orthogonal axis 23. In various embodiments, the arms 54, 56 of the stiffeners 50, 52 can be oriented at any suitable angle with respect to the lateral axis 22 and with respect to the orthogonal axis 23. Various orientations of the arms 54, 56, and the related locations of contact points between the cables 66, 68 and the arms 54, 56 and ladder rails 14, 16, will provide the ladder 10 with varying amounts of resistance to deformations along the orthogonal axis 23 and/or the lateral axis 22. As a user climbs the ladder 10, the loads on the ladder 10 can cause deformation and oscillation of a midportion of the ladder 10 in directions orthogonal to the longitudinal axis 21. For example, a midportion of the ladder 10 can displace forward-to-back, side-to-side and various combinations thereof. When a longitudinal axis 55 of an arm 50, 52 is oriented parallel to the orthogonal axis 23 (e.g. the arms 54, 56 are splayed a minimal amount), the stiffener 50, 52 provides a maximum resistance to the midportion of the ladder 10 traversing along the orthogonal axis 23 but a minimal resistance to the midportion of the ladder 10 traversing along the lateral axis 22. When a longitudinal axis 55 of an arm 50, 52 is oriented parallel to the lateral axis 22 (e.g. the arms 54, 56 are splayed a maximum amount), the stiffener 50, 52 provides a maximum resistance to the midportion of the ladder 10 traversing along the lateral axis 22 but a minimal resistance to the midportion of the ladder 10 traversing along the orthogonal axis 23. Orientations of the arms 54, 56 at angles to both the orthogonal axis 23 and the lateral axis 22 provide a desirable combination of reinforcement against movement along both the orthogonal axis 23 and the lateral axis 22.

In some embodiments, the first cable 66 contacts the first arm 54 at a first contact location 81. In some embodiments, the second cable 68 contacts the second arm 56 at a second contact location 83. In some embodiments, a distance between the first contact location 81 and the second contact location 83 is greater than a distance between the first rail 14 and the second rail 16. In some embodiments, a distance between the first contact location 81 and the second contact location 83 is greater than a distance between the second attachment location 72 and the fourth attachment location 76. In some embodiments, a distance between the first contact location 81 and the second contact location 83 is greater than a distance between the first attachment location 70 and the third attachment location 74 (e.g. between a first cable lower attachment location and a second cable lower attachment location).

In some embodiments, a first arm 54 attaches to the first rail 14 at a location oriented to a first side of the longitudinal axis 21, and the first arm 54 extends in a direction away from the longitudinal axis 21. In some embodiments, the entire first arm 54 is located to a first side of the longitudinal axis 21. In some embodiments, the entire first arm 54 is located to a first side of the first rail 14. In some embodiments, a second arm 56 attaches to the second rail 16 at a location oriented to a second side of the longitudinal axis 21, and the second arm 56 extends in a direction away from the longitudinal axis 21. In some embodiments, the entire second arm 56 is located to a second side of the longitudinal axis 21. In some embodiments, the entire second arm 56 is located to a second side of the second rail 16.

In some embodiments, a stiffener 50, 52 is detachable from the ladder 10. For example, in some embodiments, a cable 66 can be detached from the attachment locations 70, 72 and the arm 54 can be detached from the rail 14. In some embodiments, the protrusions 48 are disengaged from the rungs 15. Thus, the stiffener 50, 52 can be detached and stored when the ladder 10 is not in use.

Referring again to FIG. 1, in some embodiments, a ladder 10 comprises a first portion 20 and a second portion 30, wherein the first portion 20 is moveable with respect to the second portion 30. In some embodiments, a ladder 10 comprises an extension ladder, wherein the first portion 20 comprises a base section and the second portion 30 comprises a fly section. In some embodiments, the first portion 20 is arranged to move with respect to the second portion 30 in a linear manner, for example sliding parallel to a longitudinal axis 21 of the ladder.

In some embodiments, the first cable 66 is attached to the first portion 20 and to the second portion 30. In some embodiments, the first cable 66 is attached at a first attachment location 70 to the first portion 20 and is attached at a second attachment location 72 to the second portion 30. In some embodiments, the second cable 68 is attached to the first portion 20 and to the second portion 30. In some embodiments, the second cable 68 is attached at a third attachment location 74 to the first portion 20 and is attached at a fourth attachment location 76 to the second portion 30.

Figure 11:
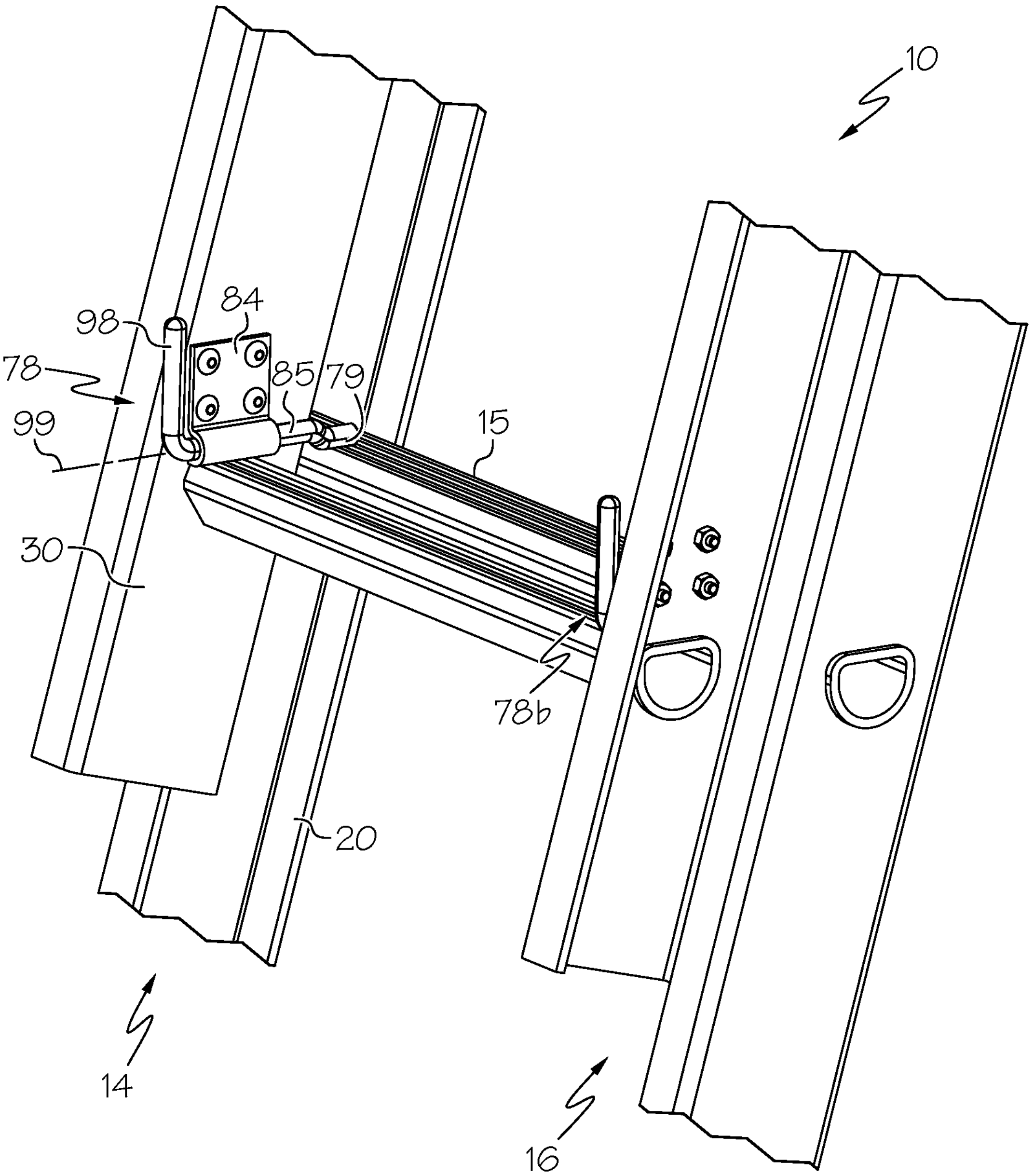
FIG. 11 shows an embodiment of a ladder and an embodiment of a lock mechanism.

FIG. 11 shows an embodiment of a lock mechanism 78. In some embodiments, a ladder 10 comprises a lock mechanism 78 arranged to apply forces between a first portion 20 and a second portion 30 of the ladder 10. In some embodiments, a lock mechanism 78 is attached to the second portion 30 and comprises a contacting surface 79 arranged to contact the first portion 20, or vice versa. In some embodiments, a lock mechanism 78 is attached to a rail 14 of the second portion 30 and the contacting surface 79 is arranged to contact a rung 15 of the first portion 20. In some embodiments, the contacting surface 79 comprises a camming surface.

In some embodiments, a lock mechanism 78 comprises a bracket 84 and a cam bar 85. In some embodiments, bracket 84 captures the cam bar 85. In some embodiments, the bracket 84 is attached to a rail 14 and supports the cam bar 85. In some embodiments, the bracket 84 defines a cavity and the cam bar 85 is positioned in the cavity. In some embodiments, the cavity defines a rotation axis 99 for the lock mechanism 78. In some embodiments, the cam bar 85 comprises a handle 98 and the contacting surface 79. In some embodiments, the handle 98 is oriented at an angle to the rotation axis 99. In some embodiments, the contacting surface 79 is offset from the rotation axis 99.

In some embodiments, the ladder 10 comprises a first lock mechanism 78 and further comprises a second lock mechanism **78*b*. In some embodiments, a shape of a second lock mechanism 78*b* comprises a mirror image of a shape of a first lock mechanism 78**.

In use, a ladder 10 comprising a first portion 20 and a second portion 30 will often be stored in a collapsed orientation. A stiffener 50 can be attached to the ladder 10 with the ladder 10 in any suitable orientation, including the collapsed orientation. The ladder 10 can be extended by moving the second portion 30 with respect to the first portion 20. Desirably, the cable 66 comprises an adjustment mechanism 90 if the ladder 10 is extended with the stiffener 50 attached to the ladder 10, and the adjustment mechanism 90 is configured to be in an adjustable configuration such as being moveable along the length of the cable 66 during the extension process. The cable 66 can be tightened to the ladder 10 by applying tension to the cable 66 and configuring the adjustment mechanism 90 to be fixed along the length of the cable 66. The lock mechanism 78 can be engaged, for example by rotating a portion of the lock mechanism 78 such as the cam bar 85. In some embodiments, the lock mechanism 78 is attached to the second portion 30 of the ladder 10 and engaging the lock mechanism 78 causes the contacting surface 79 to contact the first portion 20 of the ladder. Desirably, the lock mechanism 78 transmits forces between the first portion 20 and second portion 30 of the ladder 10.

Referring to FIGS. 7 and 11, in some embodiments, a ladder 10 comprises rung locks 37 as are generally known in the art, and further comprises a lock mechanism 78. In some embodiments, a lock mechanism 78 is arranged to reduce the load applied to the rung locks 37.

Figure 12:
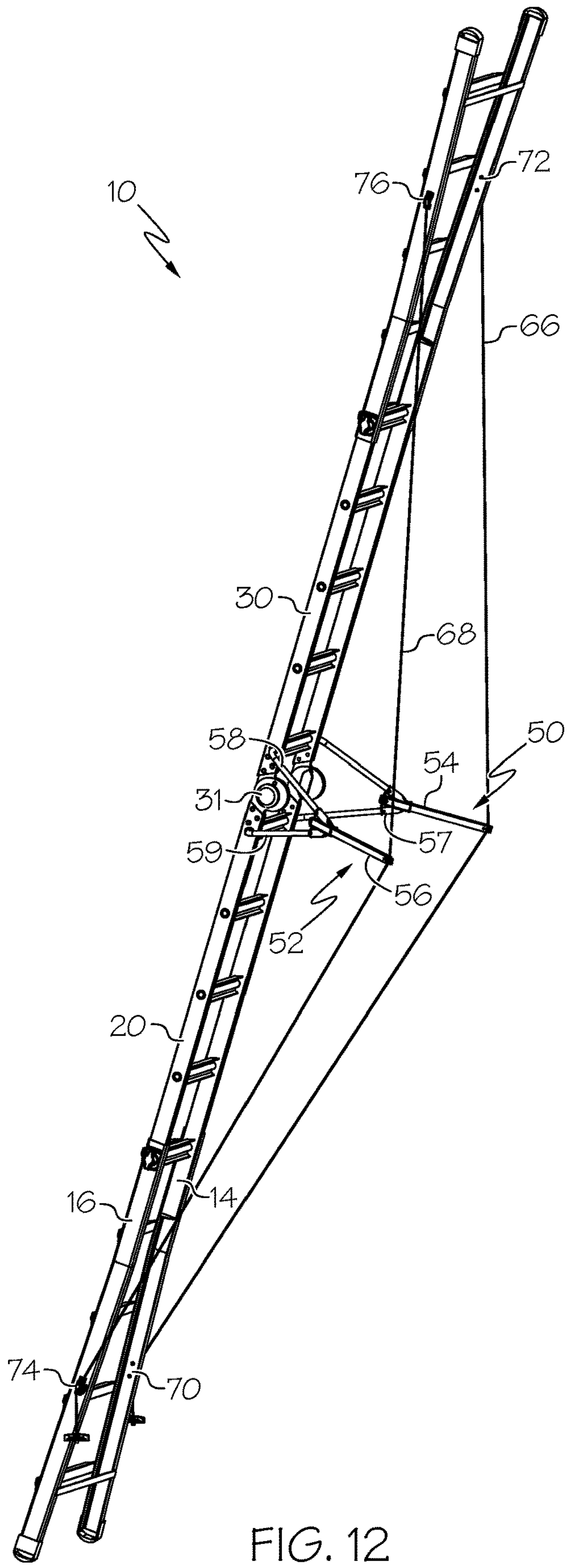
FIG. 12 shows another embodiment of a ladder and an embodiment of a stiffening system.
Figure 13:
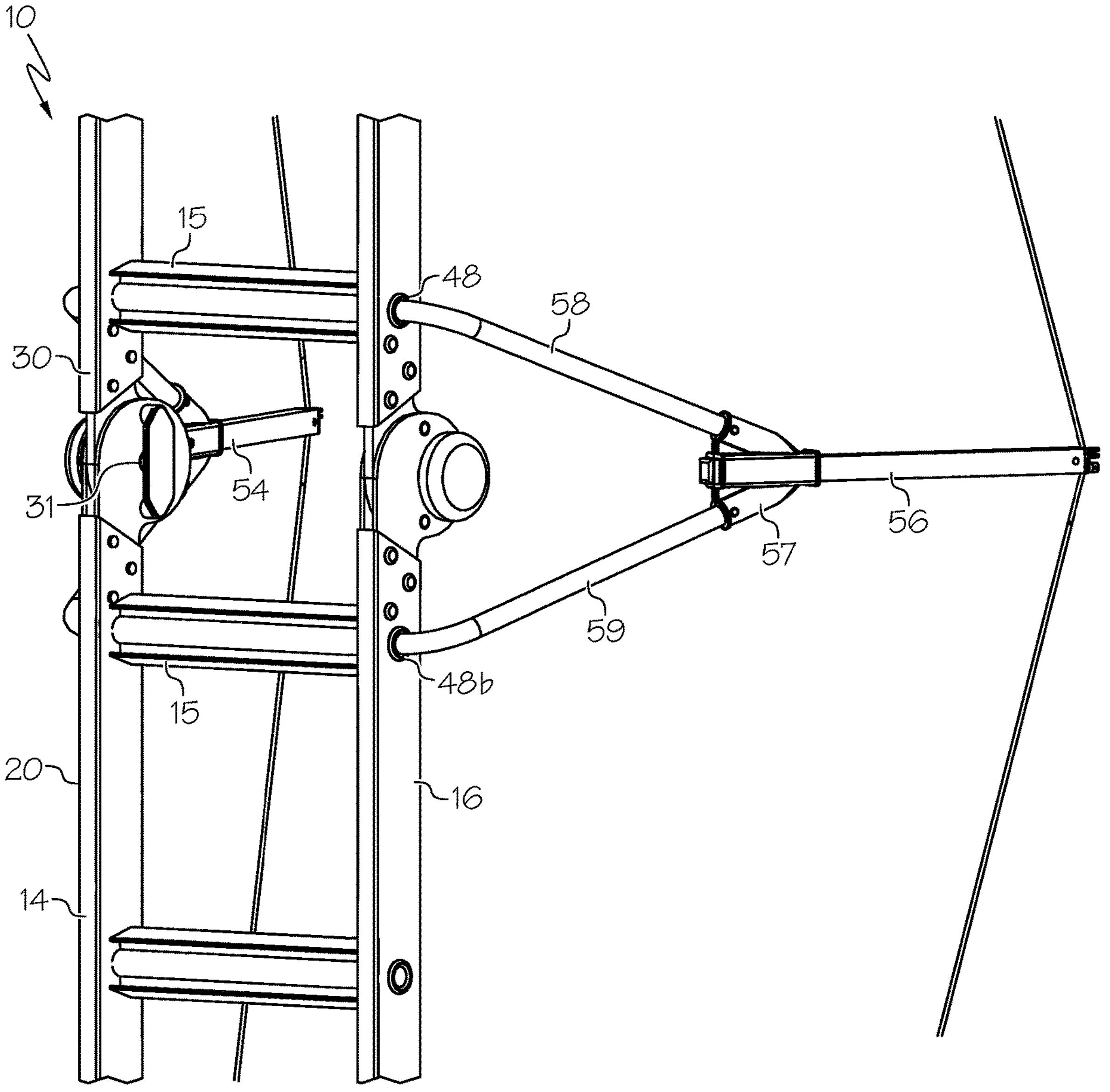
FIG. 13 shows a portion of the ladder and stiffening system shown in FIG. 12 in greater detail.

FIGS. 12 and 13 show another embodiment of a ladder 10 comprising a first stiffener 50 and a second stiffener 52.

In some embodiments, a ladder 10 comprises a first portion 20 and a second portion 30, wherein the first portion 20 is rotatable with respect to the second portion 30. In some embodiments, the first portion 20 and second portion 30 are attached by a hinge 31 that defines a rotation axis.

In some embodiments, an arm 54, 56 of a stiffener 50, 52 is arranged to engage the first portion 20 and the second portion 30 of the ladder 10. In some embodiments, an arm 54, 56 comprises a first leg 58 and a second leg 59. In some embodiments, the first leg 58 is attached to the second portion 30 of the ladder 10. In some embodiments, the first leg 58 comprises a protrusion 48 that extends through a rail 14, 16 of the second portion 30 and into a rung 15 of the second portion 30. In some embodiments, the second leg 59 is attached to the first portion 20 of the ladder 10. In some embodiments, the second leg 59 comprises a protrusion **48*b* that extends through a rail 14, 16 of the first portion 20 and into a rung 15 of the first portion 20**.

Figure 14:
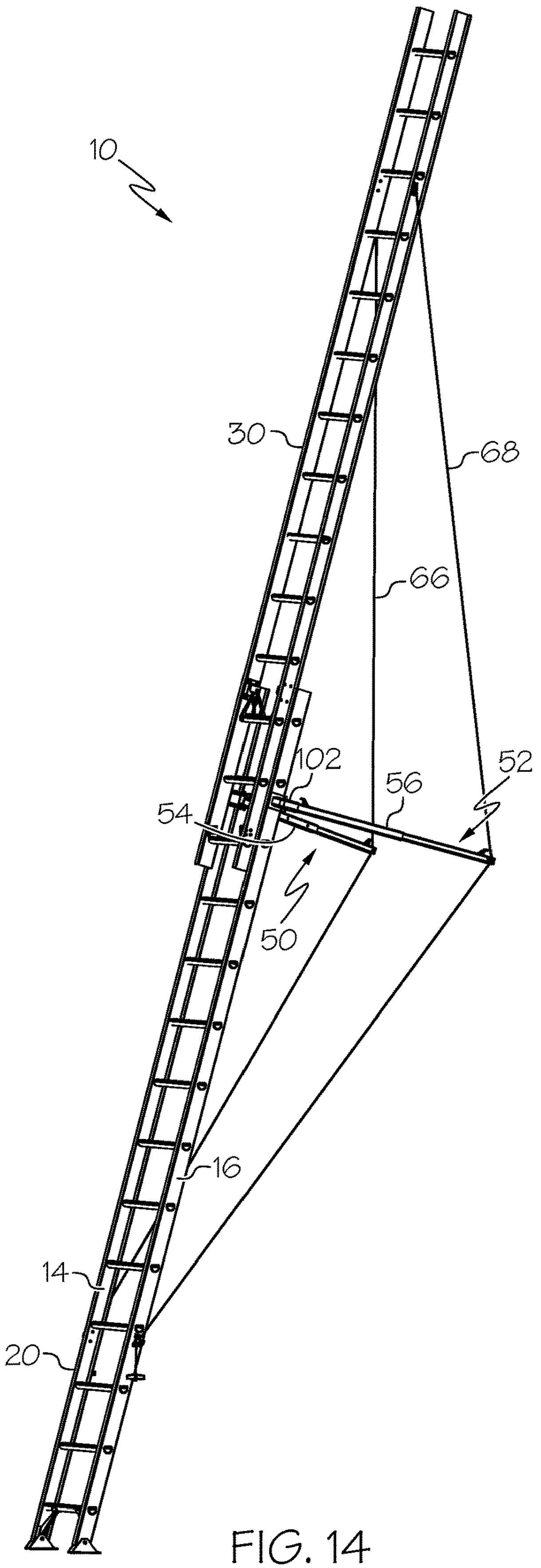
FIG. 14 shows another embodiment of a ladder and an embodiment of a stiffening system.
Figure 15:
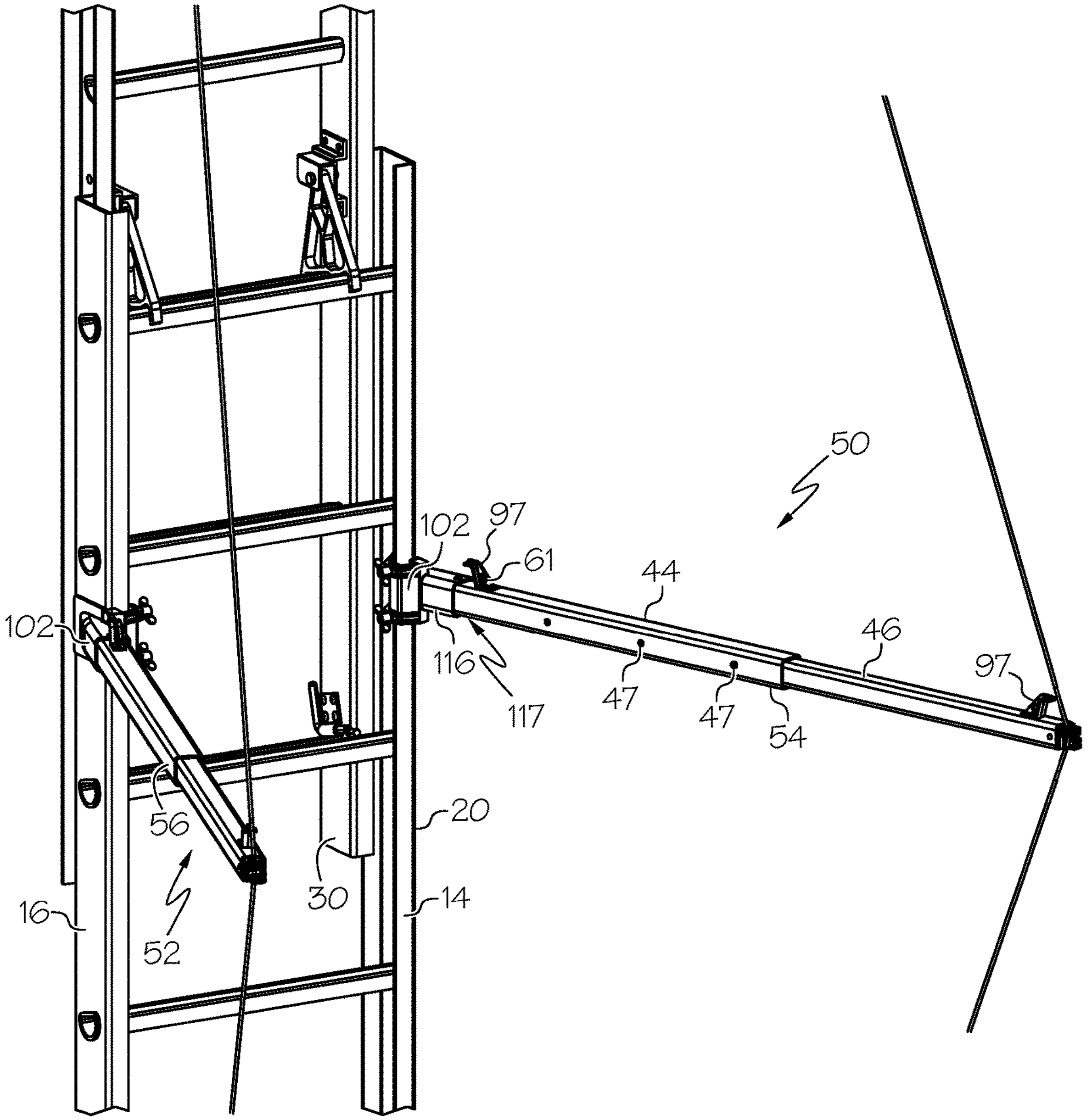
FIG. 15 shows a portion of the ladder and stiffening system shown in FIG. 14 in greater detail.

FIGS. 14 and 15 show another embodiment of a ladder 10 comprising a first stiffener 50 and a second stiffener 52. In some embodiments, an arm 54, 56 of a stiffener 50, 52 comprises a clamp 102 arranged to engage a rail 14, 16 of the ladder 10. In some embodiments, a clamp 102 provides a fixed connection between the rail 14, 16 and arm 54, 56 that is capable of transmitting moment forces. A clamp 102 can be secured or tightened using any suitable method. In some embodiments, a clamp 102 comprises a threaded fastener and a wing nut.

Figure 16:
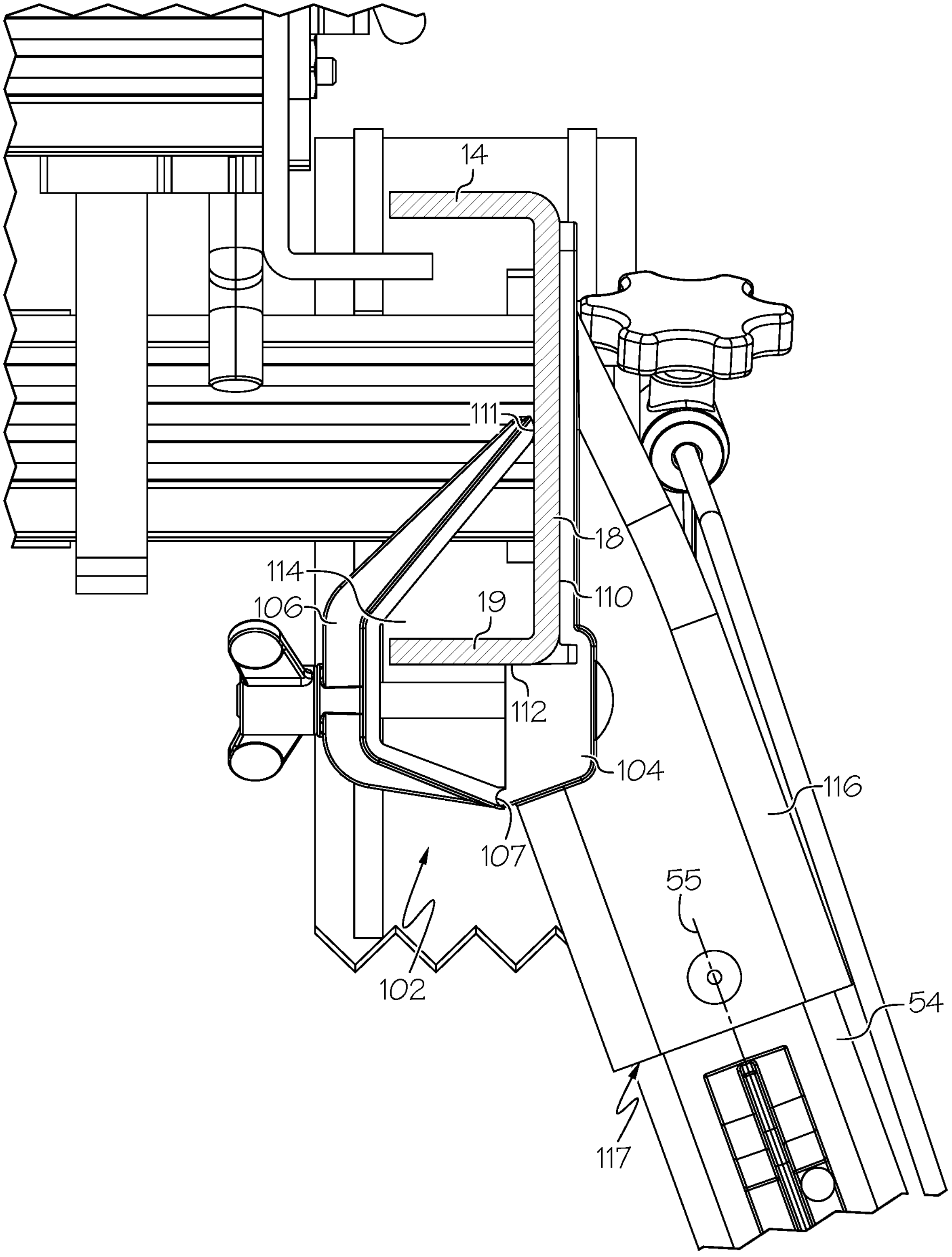
FIG. 16 shows a connection between an embodiment of a ladder and an embodiment of a stiffening system.

FIG. 16 shows an embodiment of a clamp 102 in greater detail. In some embodiments, a clamp 102 comprises a first jaw 104 and a second jaw 106. In some embodiments, the jaws 104, 106 define a cavity 114 and a portion of a rail 14 is oriented in the cavity.

In some embodiments, a rail 14 comprises a channel section, C-shape or other suitable shape that comprises a web 18 and a flange 19. In some embodiments, the web 18 and flange 19 comprise first and second portions of a rail 14 that are oriented at an angle to one another.

In some embodiments, the first jaw 104 comprises a first abutting surface 110 and a second abutting surface 112 oriented at an angle to one another. In some embodiments, the first abutting surface 110 is arranged to contact the web 18 of a rail 14 and the second abutting surface 112 is arranged to contact a flange 19 of the rail 14.

In some embodiments, the second jaw 106 comprises a contoured shape that defines at least a portion of the cavity 114 and provides clearance for the flange 19. In some embodiments, the second jaw 106 comprises a contacting portion 111 arranged to contact the web 18. In some embodiments, the second jaw 106 contacts the first jaw 104. In some embodiments, a clamp 102 comprises a hinge 107 or pivoting connection between the first jaw 104 and the second jaw 106.

In various embodiments, an arm 54 can be arranged to extend away from the clamp 102 at any suitable angle to ladder 10. In some embodiments, the arm 54 comprises a central axis 55 oriented parallel to the first abutting surface 110 of the first jaw 104. In some embodiments, the arm 54 comprises a central axis 55 oriented at a non-zero angle to the first abutting surface 110 of the first jaw 104. The non-zero angle can comprise any suitable angle. In some embodiments, the angle ranges from 1 degree to 89 degrees. In some embodiments, the angle ranges from 5 degrees to 45 degrees. In some embodiments, the angle is approximately 20 degrees.

In some embodiments, the central axis 55 is oriented at a non-zero angle to the second abutting surface 112 of the first jaw 104.

In some embodiments, the arm 54 comprises a bracket 116 arranged to attach the clamp 102 to other portions of the arm 54. In some embodiments, the bracket 116 comprises the first jaw 104. In some embodiments, the bracket 116 is attached to a portion of the arm 54 that extends away from the ladder 10. In some embodiments, the bracket 116 comprises a cavity 117 arranged to receive another portion of the arm 54. In some embodiments, the cavity 117 comprises a central axis that is collinear with the central axis 55 of the arm 54.

Figure 17:
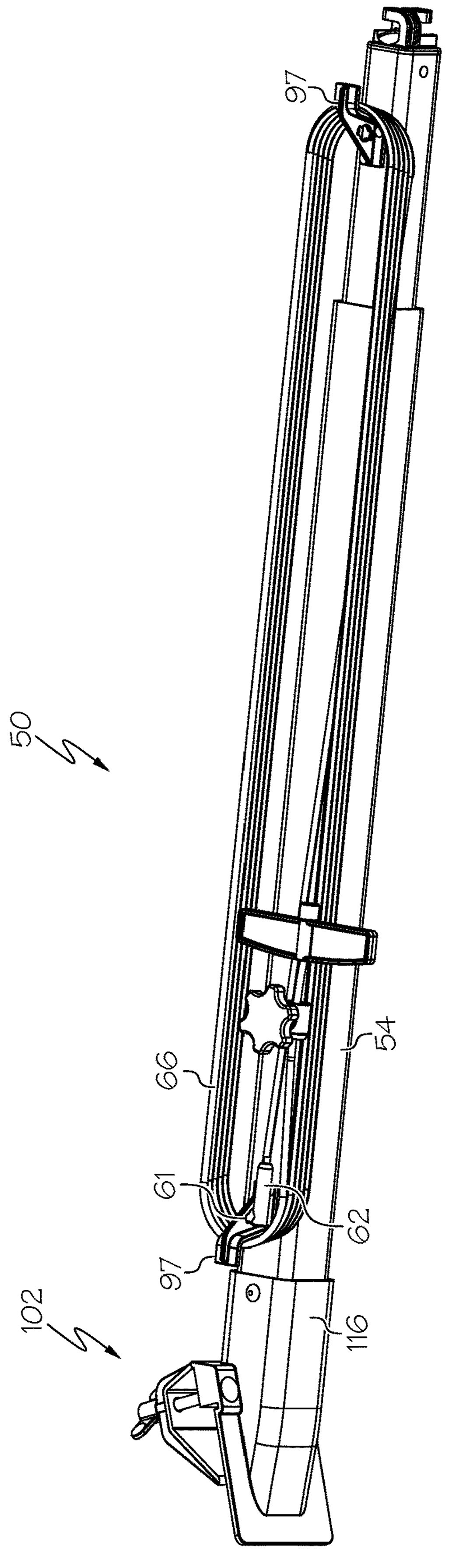
FIG. 17 shows an embodiment of a stiffening system in a storage configuration.

FIG. 17 shows an embodiment of a stiffener 50 arm 54 and cable 66 in a storage configuration.

In some embodiments, a stiffener 50 can be removed from the ladder 10 for storage. In some embodiments, the arm 54 is arranged to detach from the ladder 10, for example comprising a clamp 102. In some embodiments, an arm 54 comprises a storage bracket 97 for winding the cable 66. In some embodiments, an arm 54 comprises two brackets 97, which can face opposite directions, and the cable 66 can be wound around the brackets 97. In some embodiments, a bracket 97 comprises an aperture 61 arranged to receive a connector 62 of the cable 66. In some embodiments, the shape of an aperture 61 in a storage bracket 97 is similar to the shape of an aperture 61 in a bracket 60 attached to the ladder 10.

Figure 18:
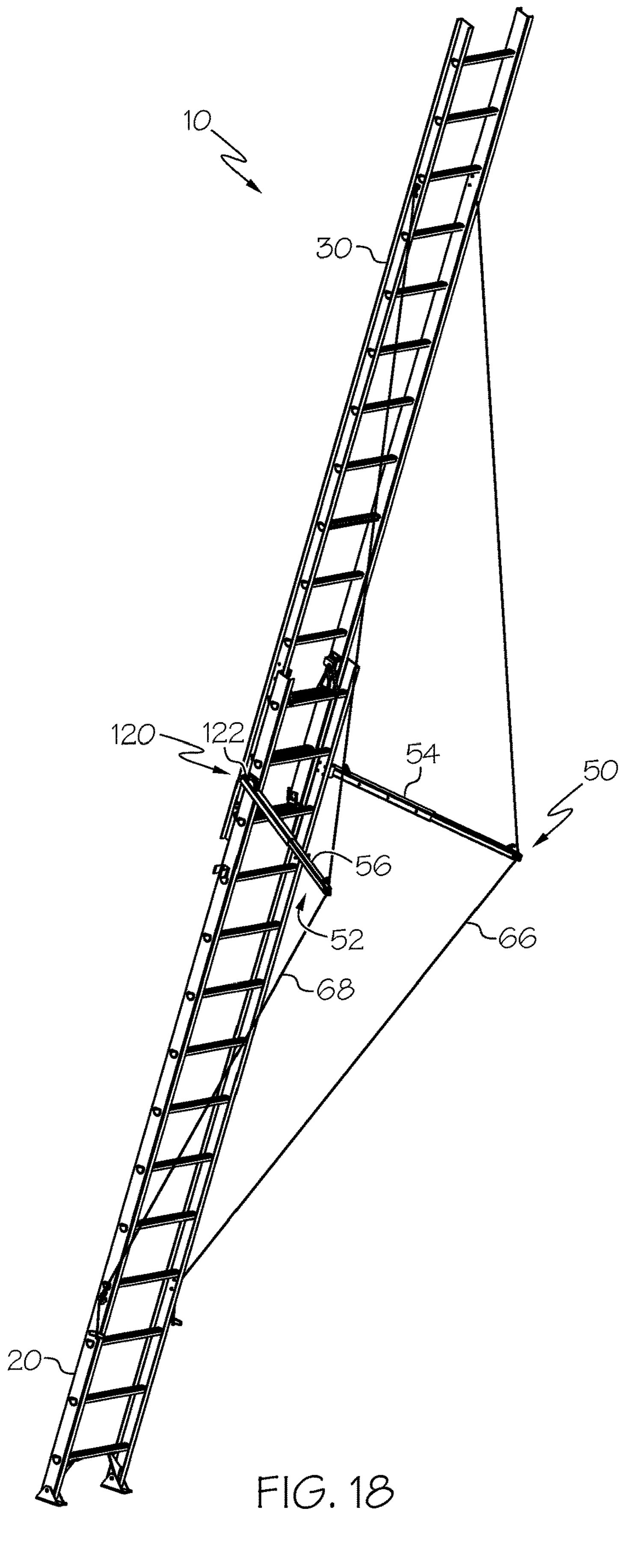
FIG. 18 shows another embodiment of a ladder comprising an embodiment of a stiffening system.

FIG. 18 shows another embodiment of a ladder 10 comprising a first stiffener 50 and a second stiffener 52. In some embodiments, an arm 54, 56 is attached to the ladder 10 and the arm 54, 56 is arranged to articulate with respect to the ladder 10. In some embodiments, the arm 54, 56 is moveable between a storage position and at least one stiffening position. In some embodiments, an arm 54, 56 comprises an articulating portion 120 that allows a portion of the arm 54, 56 to move with respect to the ladder 10. In some embodiments, the arm 54, 56 comprises an articulating bracket 122 that is attached to the ladder 10.

Figure 19:
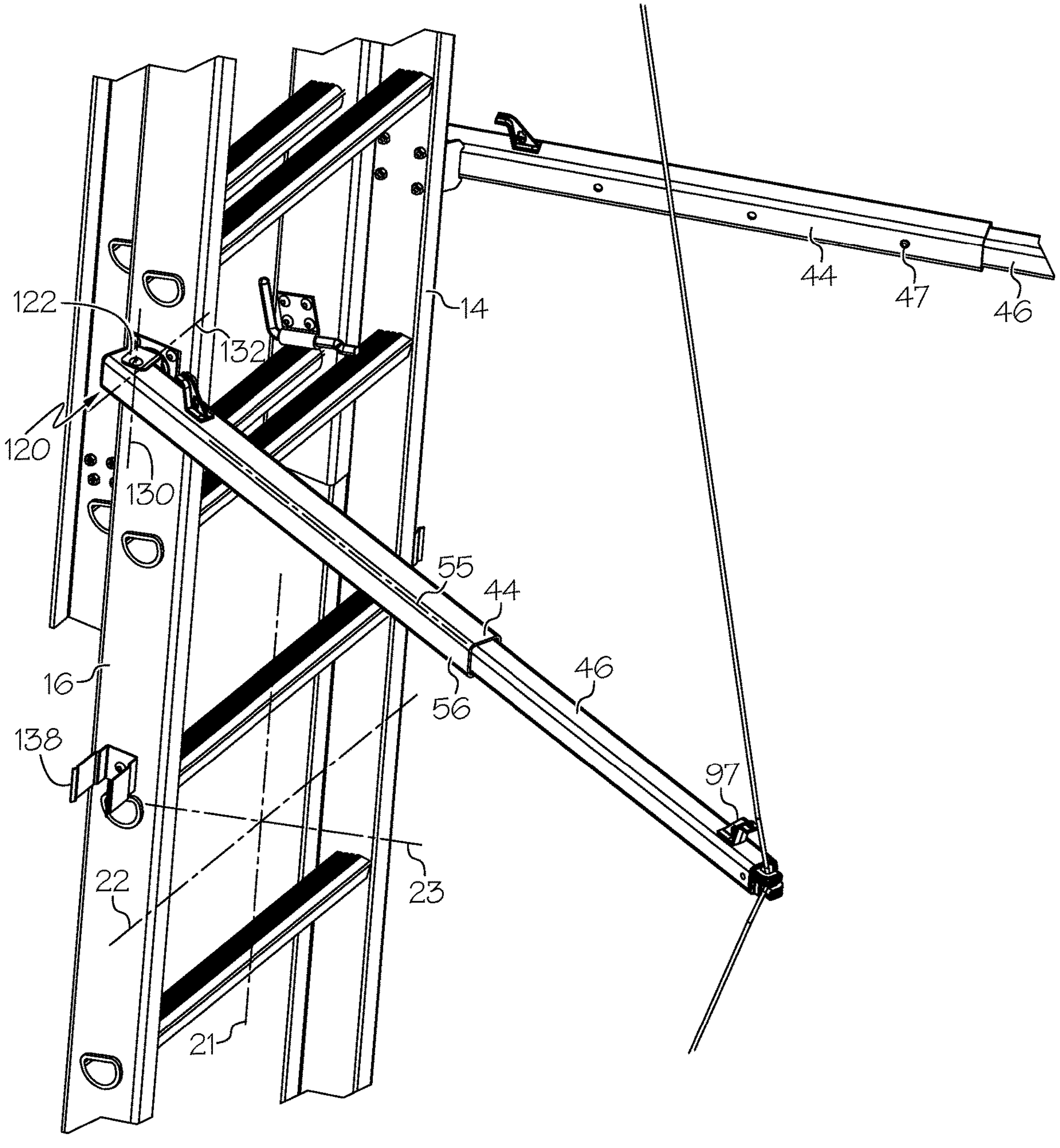
FIG. 19 shows a portion of the ladder and stiffening system shown in FIG. 18 in greater detail.
Figure 20:
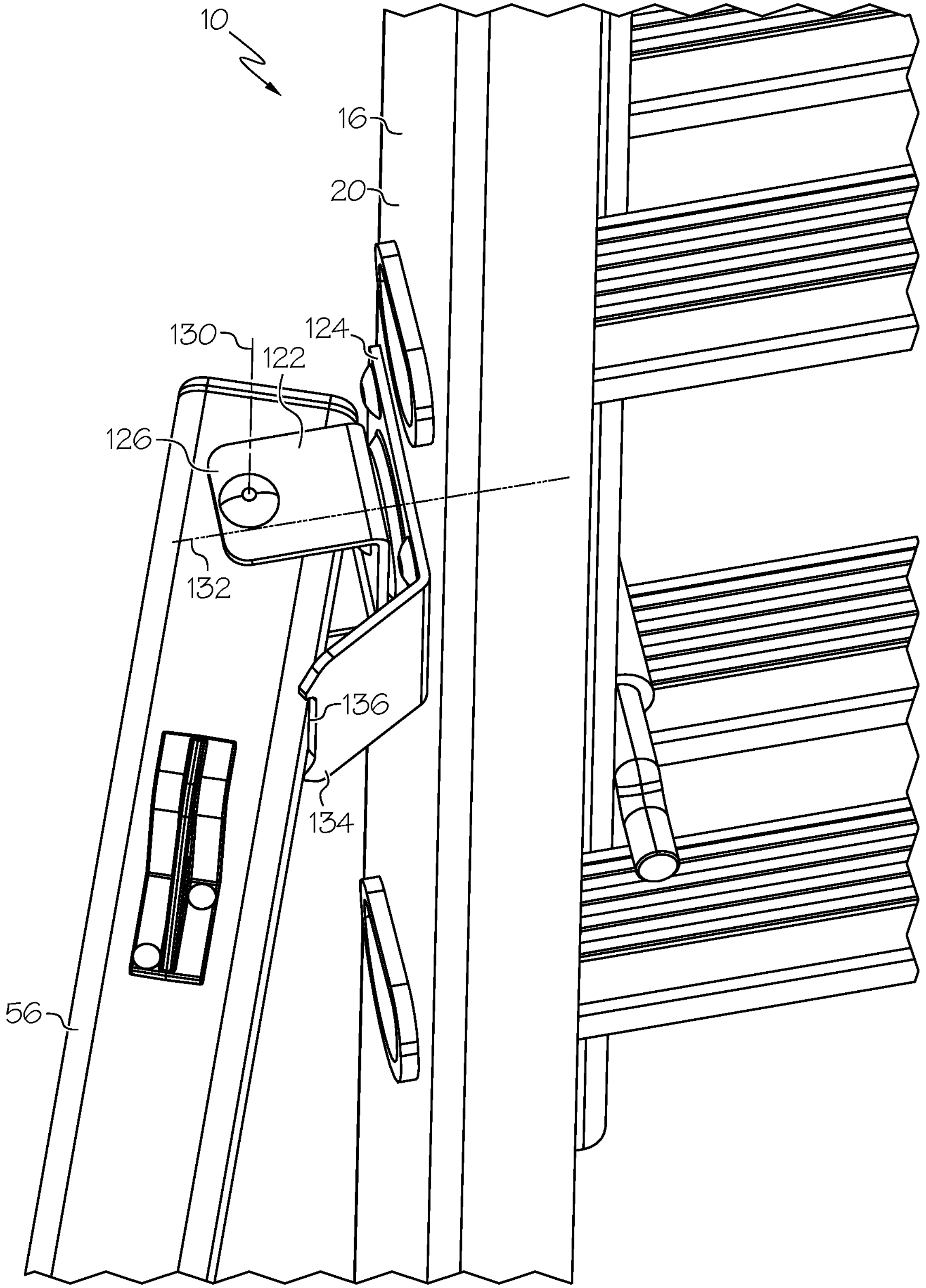
FIG. 20 shows an embodiment of a bracket.
Figure 21:
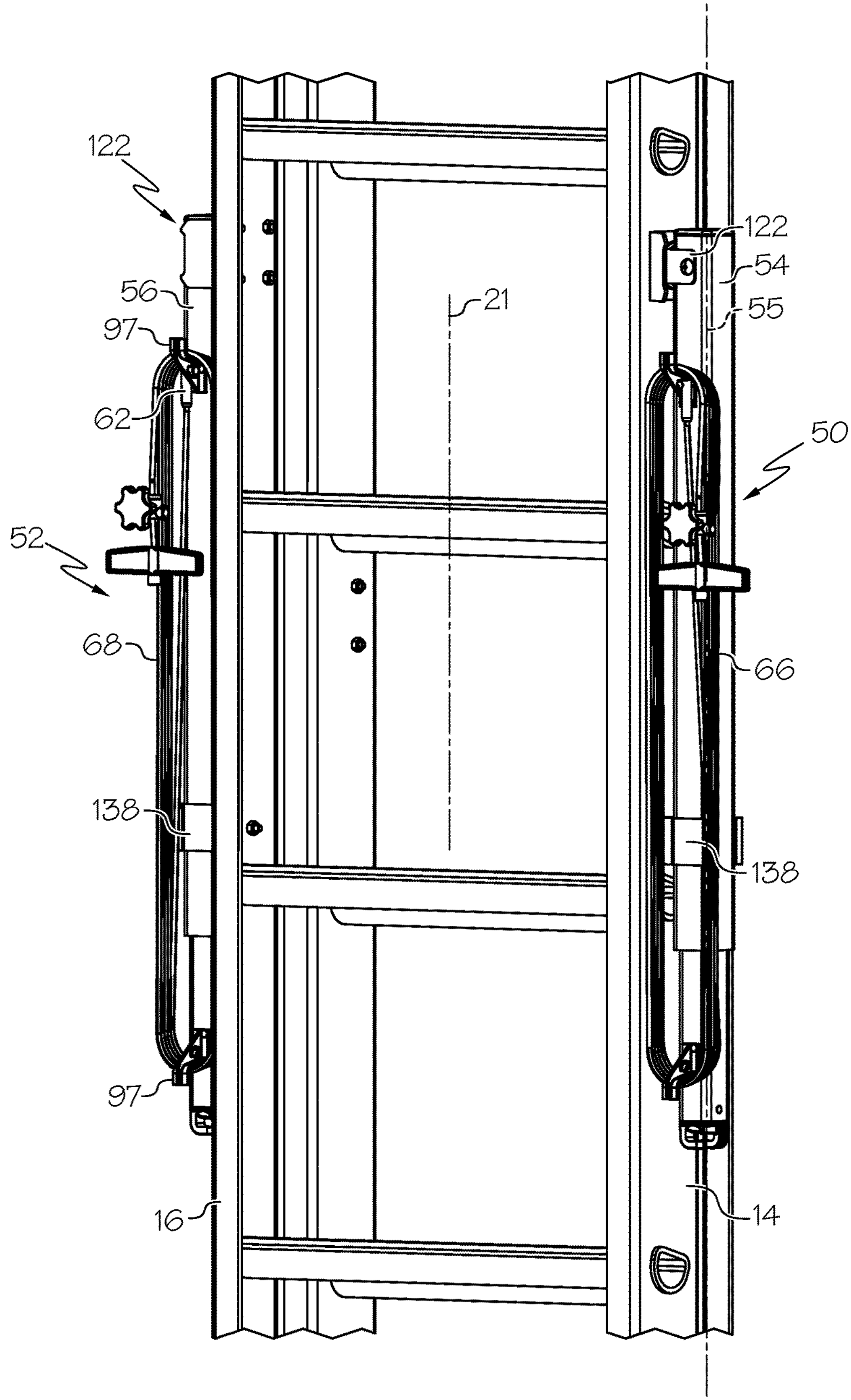
FIG. 21 shows the ladder of FIG. 18 with stiffeners in a storage configuration.

FIG. 19 shows an embodiment of an arm 56 in greater detail and FIG. 20 shows an embodiment of an articulating bracket 122 in greater detail. Desirably, an articulating portion 120 allows the arm 56 to move between a stiffening position, for example as shown in FIGS. 18 and 19, and a storage position, for example as shown in FIG. 21.

In some embodiments, when an arm 56 is in a stiffening position, a central axis 55 of the arm 56 is oriented at a non-zero angle to a longitudinal axis 21 and to a lateral axis 22 of the ladder 10. In some embodiments, when the arm 56 is in a stiffening position, a central axis 55 of the arm 56 is further oriented at a non-zero angle to an orthogonal axis 23 of the ladder 10. In some embodiments, when the arm 56 is in a storage position, a central axis 55 of the arm 56 is parallel to the longitudinal axis 21. Thus, in some embodiments, an articulating portion 120 allows for movement with respect to at least two orthogonal axes.

In some embodiments, an articulating portion 120 provides for a swiveling motion. In some embodiments, an articulating portion 120 provides for a hinging motion. In some embodiments, an articulating portion 120 comprises both a swiveling connection and a hinging connection.

In some embodiments, an articulating bracket 122 is attached between the ladder 10 and an arm 56. In some embodiments, an articulating bracket 122 is attached to a rail 16. In some embodiments, an articulating bracket 122 comprises a connector 126 attached to the arm 56, wherein the arm 56 is moveable with respect to the connector 126 about a first axis 130. In some embodiments, the arm 56 is arranged to rotate about the first axis 130 with respect to the connector 126. In some embodiments, the articulating bracket 122 further comprises a base plate 124, and the connector 126 is attached to the base plate 124. In some embodiments, the base plate 124 is attached to the rail 16. In some embodiments, the connector 126 is moveable with respect to the base plate 124 about a second axis 132. In some embodiments, the connector 126 is rotatable about the second axis 132 with respect to the base plate 124. Thus, in some embodiments, the arm 56 and the connector 126 are rotatable with respect to the base plate 124 about the second axis 132, and the arm 56 is further rotatable with respect to the connector 126 about the first axis 130. In some embodiments, the first axis 130 is oriented nonparallel to the second axis 132. In some embodiments, the first axis 130 is orthogonal with respect to the second axis 132. In some embodiments, the second axis 132 is parallel to a lateral axis 22 of the ladder 10.

In some embodiments, a positioner 134 is provided and arranged to help position the arm 56 in a stiffening position. In some embodiments, a positioner 134 is arranged to provide bracing forces to the arm 56 in the stiffening position. In some embodiments, the positioner 134 is arranged to position the arm 56 such that a central axis 55 of the arm 56 is oriented at an angle to an orthogonal axis 23 of the ladder 10. In some embodiments, a positioner 134 is attached to a rail 16. In some embodiments, an articulating bracket 122 comprises a positioner 134. In some embodiments, a base plate 126 comprises a positioner 134.

In some embodiments, a positioner 134 comprises a cantilever structure that is supported at one end and provides support to the arm 56 at another end. In some embodiments, the positioner 134 can function as a spring and provide controlled deformation in response to the loading conditions.

In some embodiments, a positioner 134 comprises a notch 136 arranged to abut and position the arm 56. In some embodiments, the notch 136 comprises opposed inclined surfaces arranged to abut the arm 56. In some embodiments, the notch 136 is centered in a plane defined by the lateral axis 22 and orthogonal axis 23 of the ladder 10.

In some embodiments, a positioner 134 is arranged to position an arm 56 with its central axis 55 in a plane defined by the lateral axis 22 and orthogonal axis 23 of the ladder 10.

In some embodiments, a positioner 134 is arranged to position an arm 56 with its central axis 55 oriented substantially orthogonally to the longitudinal axis 21 of the ladder 10.

FIG. 21 shows the ladder 10 of FIGS. 18-20 in a storage configuration, with the first stiffener 50 and the second stiffener 52 in storage orientations. In some embodiments, the arms 54, 56 of each stiffener 50, 52 can be arranged in a storage position. In some embodiments, a central axis 55 of an arm 54, 56 is oriented parallel to a longitudinal axis 21 of the ladder when the arm 54, 56 is in the storage position. In some embodiments, a cable 66, 68 is wrapped onto the arm 54, 56 in the storage orientation. In some embodiments, the cable 66, 68 is wrapped onto storage brackets 97 provided on an arm 54, 56.

In some embodiments, the ladder 10 comprises a capture bracket 138. In some embodiments, the ladder 10 comprises a capture bracket 138 for each stiffener 50, 52. In some embodiments, a capture bracket 138 is attached to a rail 14, 16. In some embodiments, a capture bracket 138 is arranged to engage an arm 54, 56. In some embodiments, a capture bracket 138 is arranged to retain the arm 54, 56 in a storage position.

Figure 22:
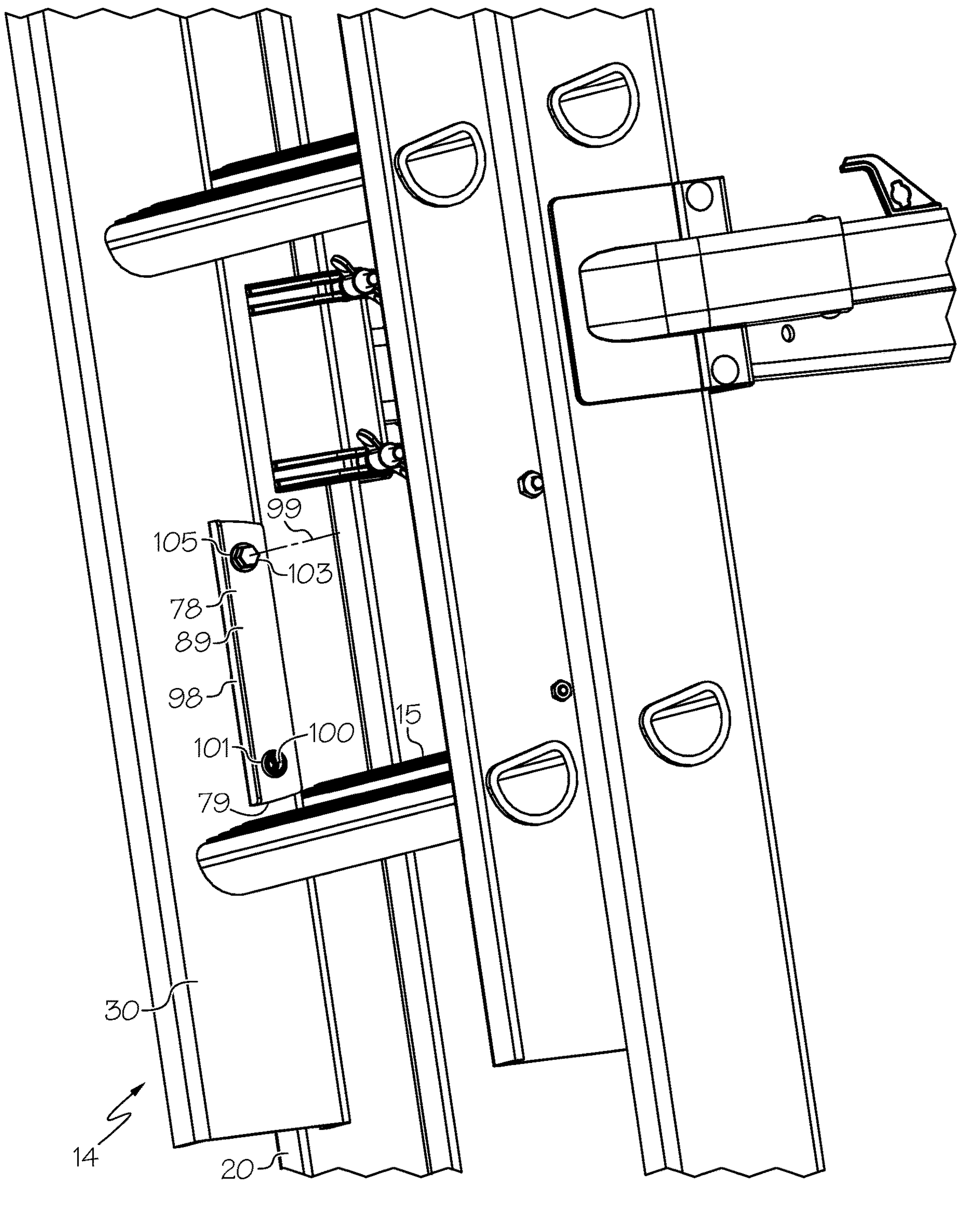
FIGS. 22 and 23 show embodiments of a lock mechanism.
Figure 23:
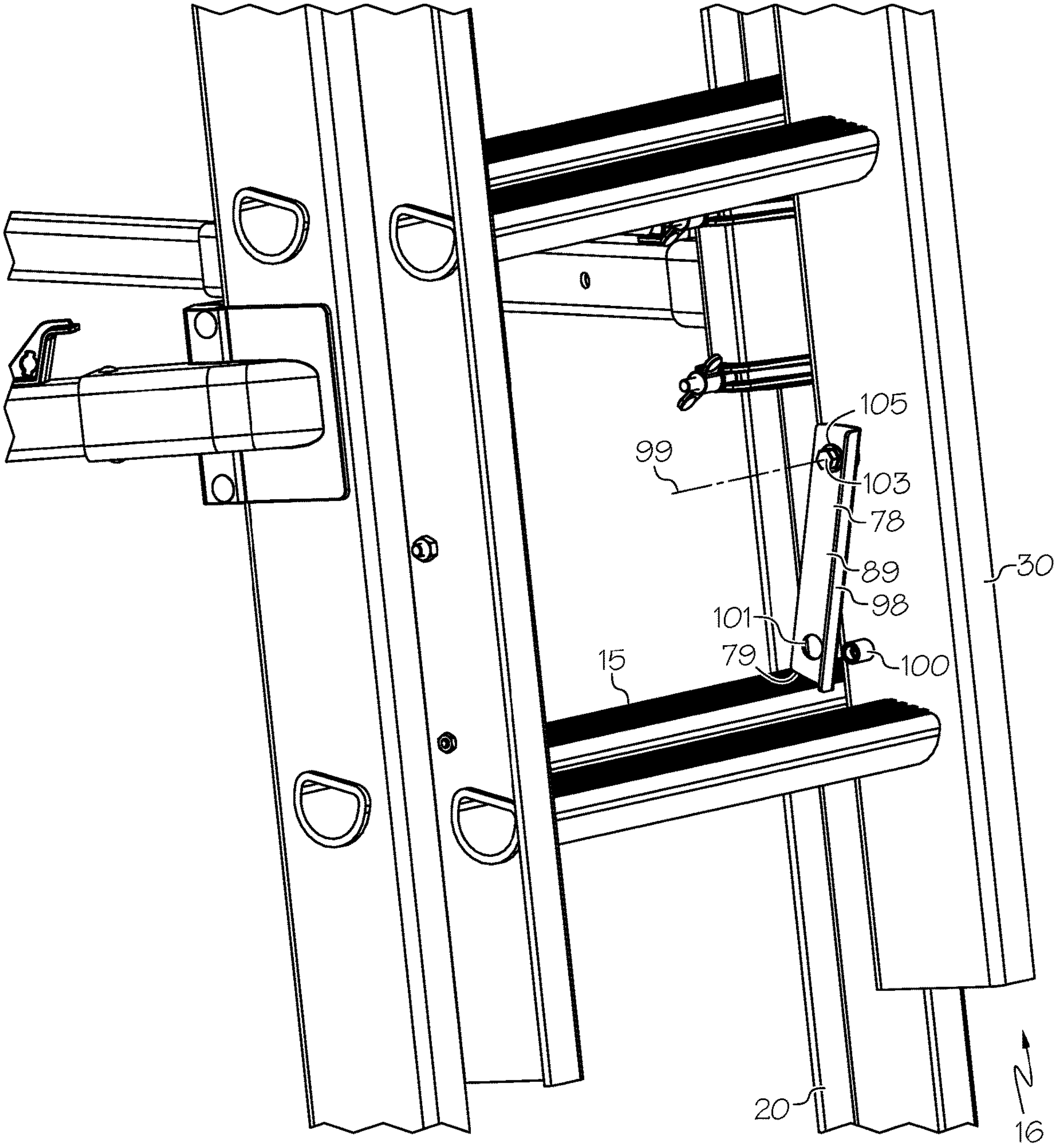

FIGS. 22 and 23 show another embodiment of a lock mechanism 78. In some embodiments, a lock mechanism 78 comprises a plate 89. In some embodiments, the plate 89 comprises a flat body. In some embodiments, the lock mechanism 78 comprises a handle 98. In some embodiments, the handle 98 comprises a portion of the plate 89 extending at an angle to the flat body.

Desirably, the lock mechanism 78 is attached to the ladder 10 and arranged to move with respect to the ladder 10. In some embodiments, the lock mechanism 78 is arranged to rotate about a rotation axis 99. In some embodiments, the rotation axis 99 is oriented parallel to a lateral axis 22 of the ladder.

In some embodiments, the plate 89 comprises an aperture 101. In some embodiments, a retainer 100 is provided. In some embodiments, a retainer 100 is attached to a rail 14, 16. In some embodiments, the retainer 100 engages the plate 89 and retains the plate 89 in a particular orientation, such as a stowed orientation. In some embodiments, the retainer 100 comprises a pin and the pin is arranged to extend into the aperture 101. In some embodiments, the retainer 100 prevents the lock mechanism 78 from moving about the rotation axis 99.

In some embodiments, the plate 89 is attached to a rail 14, 16 by a fastener 103. In some embodiments, the fastener 103 defines the rotation axis 99. In some embodiments, the fastener 103 provides a gap between a head of the fastener 103 and the rail 14, 16, and in some embodiments, the gap is greater than a thickness of the plate 89. This arrangement provides clearance for the plate 89 to be moved and disengaged from the retainer 100. For example, the plate 89 can be rotated slightly about an axis oriented orthogonal to the rotation axis 99, allowing the plate 89 to be lifted off the retainer 100. In some embodiments, a biasing member 105 is provided and arranged to bias the plate 89 against the rail 14, 16. In some embodiments, the biasing member 105 comprises a wave spring arranged to surround a shaft of the fastener 103. In some embodiments, a wave spring biasing member 105 is provided between the head of the fastener 103 and the plate 89. Thus, the biasing member 105 can bias the plate 89 to an orientation where the retainer 100 can capture the plate 89, and the biasing can be overcome by lifting the plate 89 to remove the plate 89 from the retainer 100.

Desirably, the lock mechanism 78 comprises a contacting surface 79. In some embodiments, the contacting surface 79 comprises a camming surface. In some embodiments, an end of the plate 89 comprises a contacting surface 79. In some embodiments, the plate 89 is attached to the second portion 30 of a rail 14, 16 and the contacting surface 79 is arranged to contact the first portion 20 of the ladder 10. In some embodiments, the contacting surface 79 is arranged to contact a rung 15 of the first portion 20 of the ladder 10.

In some embodiments, a ladder 10 comprises a first stiffener 50 and a second stiffener 52, and further comprises a cross-brace attached between the first stiffener 50 and the second stiffener 52. In some embodiments, a cross-brace is attached to a first arm 54 of the first stiffener 50 and a second arm 56 of the second stiffener 52.

The above disclosure is intended to be illustrative and not exhaustive. This description will suggest many variations and alternatives to one of ordinary skill in this field of art. All these alternatives and variations are intended to be included within the scope of the claims where the term “comprising” means “including, but not limited to.” Those familiar with the art may recognize other equivalents to the specific embodiments described herein which equivalents are also intended to be encompassed by the claims.

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the preferred and alternate embodiments of the invention. Those skilled in the art may recognize other equivalents to the specific embodiment described herein which equivalents are intended to be encompassed by the claims attached hereto.

The invention claimed is:

1. A stiffener system arranged to attach to a ladder, the ladder comprising a first rail, a second rail and a plurality of rungs extending between the first rail and the second rail, the first rail comprising a first outer side, the second rail comprising a second outer side, the ladder defining a longitudinal axis, a lateral axis and an orthogonal axis, the longitudinal axis extending parallel to the first rail and the second rail, the lateral axis extending through the first outer side and the second outer side, the orthogonal axis oriented orthogonal to the longitudinal axis and to the lateral axis, the stiffener system comprising:

a first arm and a first cable;

a second arm and a second cable;

the first cable comprising a first engagement portion arranged to engage the first outer side at a first cable attachment location, the first cable comprising a second engagement portion arranged to engage the first rail at a second cable attachment location, the first cable comprising an adjustment mechanism arranged to move the first engagement portion along a length of the first cable, the first cable arranged to contact the first arm at a first contact location;

the first arm arranged to engage the ladder at a first arm attachment location between the first cable attachment location and the second cable attachment location, the first arm extending from the first outer side away from the first rail, the first arm comprising a first central axis oriented at a non-zero angle to a first reference plane comprising the longitudinal axis and the orthogonal axis, the first central axis oriented at a non-zero angle to a second reference plane comprising the longitudinal axis and the lateral axis;

the second cable comprising a third engagement portion arranged to engage the second outer side at a third cable attachment location, the second cable comprising a fourth engagement portion arranged to engage the second rail at a fourth cable attachment location, the second cable arranged to contact the second arm at a second contact location;

the second arm arranged to engage the ladder at a second arm attachment location between the third cable attachment location and the fourth cable attachment location, the second arm extending from the second outer side away from the second rail, the second arm comprising a second central axis oriented at an angle of at least 10 degrees to the first central axis;

wherein a distance between the first contact location and the second contact location is greater than a distance between the first arm attachment location and the second arm attachment location.

2. The stiffener system of claim 1, the first cable comprising an end portion that extends past the first engagement portion, the end portion comprising a handle.

3. The stiffener system of claim 1, the adjustment mechanism comprising a clamp arranged to engage the first cable, the clamp comprising a first orientation and a second orientation, in the first orientation the clamp moveable along a length of the first cable, in the second orientation the clamp fixed along the length of the first cable.

4. The stiffener system of claim 1, the first arm comprising a clamp having an open position and a closed position, the clamp arranged to fixedly engage the first rail in the closed position.

5. The stiffener system of claim 1, the first arm comprising an articulating portion arranged for attachment to the first rail, the articulating portion arranged to rotate the first arm about a first axis and to rotate the first arm about a second axis, the first axis orthogonal to the second axis.

6. The stiffener system of claim 1, the first arm comprising a guide member arranged to engage the first cable at the first contact location, the guide member comprising a first hook oriented in a first direction and a second hook oriented in a second direction.

7. The stiffener system of claim 1, the first engagement portion comprising a bracket arranged to attach to the first outer side, the first cable comprising a connector arranged to engage the bracket.

8. The stiffener system of claim 7, the bracket comprising a shaped aperture, the connector comprising a protrusion comprising a key, the protrusion positionable in the shaped aperture, the connector comprising a locked orientation wherein the key cannot exit the shaped aperture and a disengagable orientation wherein the key can pass through the shaped aperture.

9. The stiffener system of claim 1, the ladder comprising a first ladder portion arranged to move with respect to a second ladder portion and rung locks, the stiffener system further comprising:

a lock mechanism arranged to attach to the second ladder portion, the lock mechanism comprising a lock member arranged to move with respect to the second ladder portion, the lock member comprising a contacting surface arranged to contact the first ladder portion.

10. The stiffener system of claim 1, the first arm comprising a protrusion arranged to extend into a rung of the plurality of rungs.

11. The stiffener system of claim 1, the first arm comprising a first leg and a second leg, the first leg comprising a first protrusion arranged to extend into a first rung of the plurality of rungs, the second leg comprising a second protrusion arranged to extend into a second rung of the plurality of rungs.

12. A stiffener system arranged to attach to a ladder, the stiffener system comprising:

an arm and a cable;

the cable comprising a first engagement portion arranged to engage the ladder at a first cable attachment location, the cable comprising a second engagement portion arranged to engage the ladder at a second cable attachment location, the cable comprising an adjustment mechanism arranged to move the second engagement portion along a length of the cable, the cable arranged to contact the arm;

the arm arranged to engage the ladder at an attachment location between the first cable attachment location and the second cable attachment location, the arm oriented at a non-zero angle to an orthogonal axis of the ladder;

a bracket arranged to attach to the ladder, the cable comprising a connector arranged to engage the bracket, the connector comprising the adjustment mechanism comprising a first orientation and a second orientation, in the first orientation the connector moveable along the length of the cable, in the second orientation the connector fixed along the length of the cable.

13. A stiffener system arranged to attach to a ladder, the ladder comprising a first rail, a second rail and a plurality of rungs extending between the first rail and the second rail, the first rail comprising a first outer side, the second rail comprising a second outer side, the stiffener system comprising:

a first arm and a first cable;

a second arm and a second cable;

the first cable comprising a first engagement portion arranged to engage the first outer side at a first cable attachment location, the first cable comprising a second engagement portion arranged to engage the first rail at a second cable attachment location, the first cable arranged to contact the first arm at a first contact location;

the first arm arranged to engage the ladder at a first arm attachment location between the first cable attachment location and the second cable attachment location, the first arm extending from the first outer side away from the first rail;

the second cable comprising a third engagement portion arranged to engage the second outer side at a third cable attachment location, the second cable comprising a fourth engagement portion arranged to engage the second rail at a fourth cable attachment location, the second cable arranged to contact the second arm at a second contact location;

the second arm arranged to engage the ladder at a second arm attachment location between the third cable attachment location and the fourth cable attachment location, the second arm extending from the second outer side away from the second rail, the second arm oriented at an angle of at least 10 degrees to the first arm;

wherein a distance between the first contact location and the second contact location is greater than a width of the ladder from the first outer side to the second outer side.

14. The stiffener system of claim 13, the ladder comprising a first ladder portion arranged to move with respect to a second ladder portion, a first rung lock and a second rung lock, the stiffener system further comprising a lock mechanism arranged to attach to a rail of the second ladder portion, the lock mechanism comprising a lock member arranged to move with respect to the second ladder portion, the lock member comprising a contacting surface arranged to contact a tread surface of a rung of the first ladder portion.

15. The stiffener system of claim 14, the contacting surface comprising a camming surface.

16. The stiffener system of claim 13, the first arm comprising a clamp having an open position and a closed position, the clamp arranged to fixedly engage the first arm attachment location in the closed position.

17. The stiffener system of claim 13, the first arm comprising an articulating bracket arranged for attachment to the first arm attachment location, the articulating bracket arranged to rotate the first arm about a first axis and to rotate the first arm about a second axis, the first axis orthogonal to the second axis.

18. The stiffener system of claim 13, the first engagement portion comprising a bracket arranged to attach to the first outer side at the first cable attachment location, the first cable comprising a connector arranged to engage the bracket.

19. The stiffener system of claim 18, the bracket comprising a shaped aperture, the connector comprising a protrusion comprising a key.

20. The stiffener system of claim 13, the first cable comprising a first adjustment mechanism arranged to move the first engagement portion along a length of the first cable.

* * * * *